US011029241B2

(12) United States Patent
Bachalo et al.

(10) Patent No.: US 11,029,241 B2
(45) Date of Patent: Jun. 8, 2021

(54) ENHANCED DETECTION THROUGH PARSING RECORDS INTO SIGNAL COMPONENTS

(71) Applicant: Artium Technologies, Inc., Sunnyvale, CA (US)

(72) Inventors: William D. Bachalo, Los Altos Hills, CA (US); Gregory A. Payne, Richland, WA (US); Khalid Ibrahim, Hatfield, PA (US); Michael J. Fidrich, San Jose, CA (US); Chad M. Sipperley, Palm City, FL (US)

(73) Assignee: Artium Technologies, Inc., Sunnyvale, CA (US)

( * ) Notice: Subject to any disclaimer, the term of this patent is extended or adjusted under 35 U.S.C. 154(b) by 766 days.

(21) Appl. No.: 14/622,789

(22) Filed: Feb. 13, 2015

(65) Prior Publication Data

US 2016/0238510 A1   Aug. 18, 2016

(51) Int. Cl.
*G01N 15/14* (2006.01)
*G01N 15/02* (2006.01)
*G01N 15/10* (2006.01)

(52) U.S. Cl.
CPC ..... *G01N 15/1429* (2013.01); *G01N 15/0205* (2013.01); *G01N 15/0211* (2013.01); *G01N 15/1434* (2013.01); *G01N 2015/1075* (2013.01); *G01N 2015/145* (2013.01); *G01N 2015/1461* (2013.01); *G01N 2015/1493* (2013.01)

(58) Field of Classification Search
None
See application file for complete search history.

(56) References Cited

U.S. PATENT DOCUMENTS

| | | | | |
|---|---|---|---|---|
| 4,179,218 A * | 12/1979 | Erdmann | ........... | G01N 15/1429 250/574 |
| 4,251,733 A * | 2/1981 | Hirleman, Jr. | ............ | G01P 5/20 250/575 |
| 5,289,391 A * | 2/1994 | Ibrahim | ................. | H03D 3/007 375/316 |
| 5,784,160 A * | 7/1998 | Naqwi | ................... | G01B 11/10 356/336 |
| 2007/0263215 A1 * | 11/2007 | Bachalo | ............. | G01B 9/02045 356/336 |
| 2008/0221711 A1 | 9/2008 | Trainer | | |
| 2010/0090677 A1 | 4/2010 | Britton et al. | | |
| 2014/0268102 A1 | 9/2014 | Shah | | |

OTHER PUBLICATIONS

European Patent Office Communication enclosing Extended European Search Report for corresponding European Patent Application No. 16155403.5, 8 pp., (dated Jul. 6, 2016).

* cited by examiner

*Primary Examiner* — Shaun M Campbell
*Assistant Examiner* — Aneta B Cieslewicz
(74) *Attorney, Agent, or Firm* — Womble Bond Dickinson (US) LLP

(57) ABSTRACT

Methods and apparatuses to detect particles in dense particle fields are described. A time varying signal is partitioned into a plurality of segments. Parameters are determined from the segments. The time varying signal is parsed into a plurality of individual particle signal components based on the plurality of parameters.

37 Claims, 15 Drawing Sheets

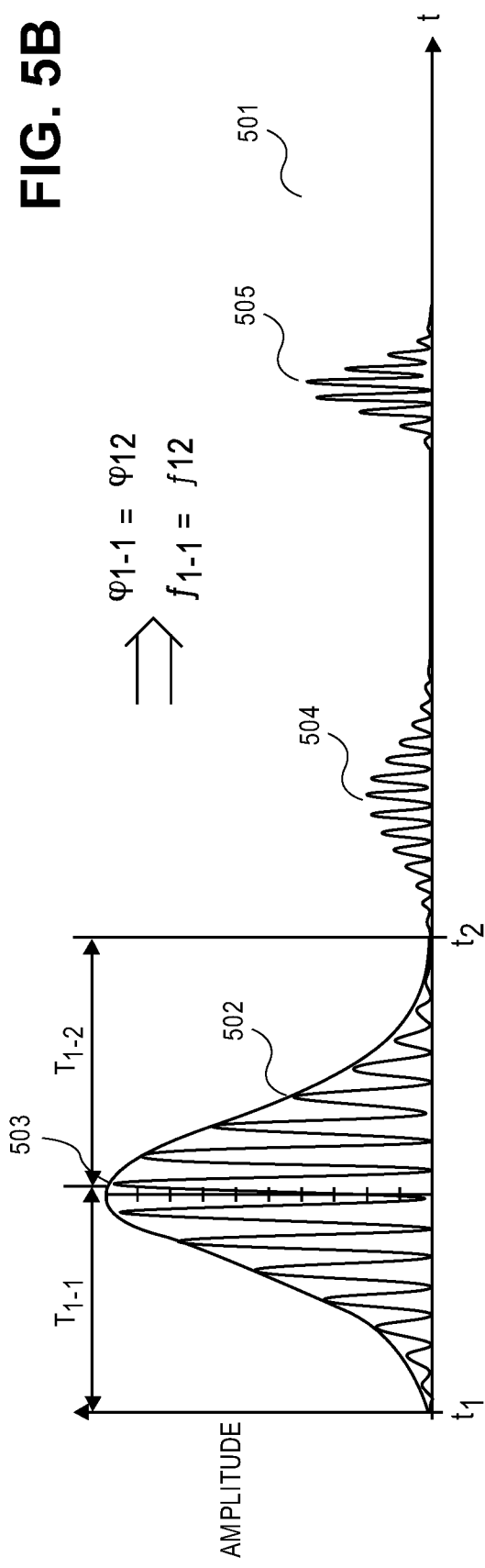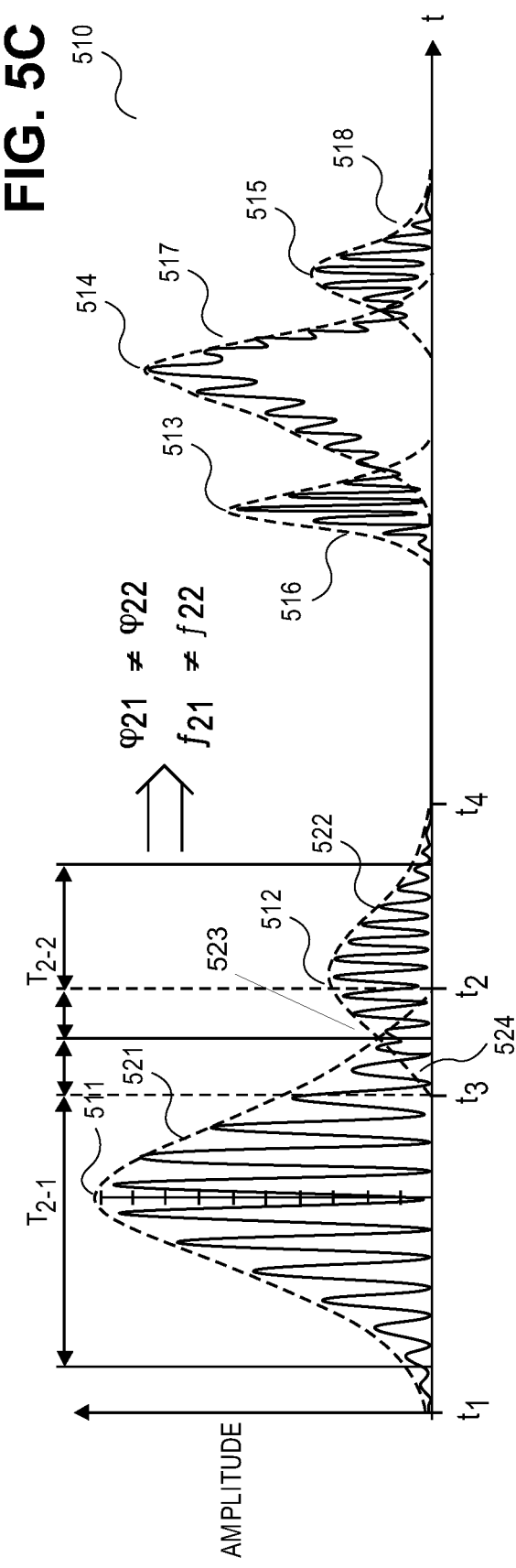

ENHANCED DETECTION THROUGH PARSING RECORDS INTO SIGNAL COMPONENTS

GOVERNMENT LICENSE RIGHTS

This invention was made with government support under Contract No. NNX14CC65P awarded by National Aeronautics and Space Administration (NASA). The government has certain rights in the invention.

FIELD

Embodiments of the invention relate to characterization of particles. More particularly, embodiments of the invention relate to characterization of particles in particle fields.

BACKGROUND

Measurements and information on various particles are used for numerous applications in a wide range of industries. These applications include fuel spray combustion analysis and control for the automotive, jet engine, or other gas turbine engine design, development, and testing applications. The applications also include medical inhaler development, evaluation, and testing for the pharmaceutical industries, household spray nozzle development and evaluation, agricultural pesticide and irrigation sprays, aircraft icing research, simulations, and testing, and a wide range of other spray application related functions. Each of these applications is characterized in terms of the particle field conditions, the application environments, and general accuracy requirements under these conditions. For example, measurements of spray droplets and particle size, velocity, turbulence, volume flux, and concentrations using phase Doppler and laser Doppler methods are affected by particle coincidence (more than one particle in the measurement volume at one time). Other instruments that utilize the general approach of single particle counting to measure particle size and concentrations are also affected by particle coincidence.

Typically, laser light scattering interferometry is used to determine the size and velocity of particles, for example, droplets, bubbles, and other particles. According to this technique, particles under test pass the intersection point formed by two intersecting or crossed laser beams generated from the same laser. The light scattered from a particle, as the particle passes the intersection point of the two laser beams, forms an interference fringe pattern at a receiver which is collected and transmitted to a detector.

A spatial frequency of the interference fringe pattern generated by the light scattered by the particle, as it passes through the intersection point of the two crossed laser beams, is used to determine the particle size and one velocity component in the plane of two crossing laser beams. The temporal frequency is the Doppler difference frequency which is relatable to the velocity of the particle. The spatial frequency of the interference pattern is generally inversely proportional to the diameter of the particle assumed to be a sphere or quasi-spherical particle. Measurement of the particle size and velocity using the phase Doppler particle analyzer (also known as phase Doppler interferometer, phase Doppler particle analyzer, phase Doppler anemometer, or particle dynamics analyzer) requires a sufficient probability of only one particle passing through the measurement volume at one time.

More than one particle passing through the measurement volume, known as coincidence, can lead to measurement errors, due to corruption of the measurements, missing the measurement of one of the particles, or both. These errors can lead to significant measurement error when measuring size distributions, especially in dense particle fields or sprays. For example, in gasoline direct injection and diesel sprays, droplet number densities may be very high creating measurement difficulties for instruments such as the phase Doppler method which detect and measure individual droplets passing the measurement volume. Under dense spray conditions, a droplet detector can remain active over a continuation of several signals as they pass through the measurement volume. When processed, these contiguous signals may produce erroneous measurements, may be rejected or only the dominant signal may be processed and the remaining signals under the detected event rejected. This can lead to measurement error and false counting of the particles.

SUMMARY

Methods and apparatuses to characterize a particle size, a particle velocity, or both in particle fields are described. For an embodiment, a time varying signal is partitioned into a plurality of segments. A plurality of parameters are determined from the segments. The time varying signal is parsed into a plurality of individual signal components based on the plurality of parameters.

For an embodiment, a time varying signal is received. The time varying signal is partitioned into a plurality of timing segments. Peak amplitudes are located in the time varying signal. A change is determined in at least one of timing parameters for the plurality of timing segments. A plurality of individual particle signal components are identified based at least on the change.

For an embodiment, a non-transitory machine-readable medium comprises data that when accessed by a data processing system, cause the data processing system to perform a method to enhance detection of particles that involves partitioning a time varying signal into a plurality of segments; determining a plurality of parameters from the segments; and parsing the time varying signal into a plurality of individual particle signal components based on the plurality of parameters.

For an embodiment, a non-transitory machine-readable medium comprises data that when accessed by a data processing system, cause the data processing system to perform a method to mitigate particle measurement errors in a particle field that involves receiving a time varying signal; partitioning the time varying signal into a plurality of timing segments; locating peak amplitudes in the time varying signal; determining a change in at least one of timing parameters for the plurality of timing segments; and identifying a plurality of individual particle signal components based at least on the change.

For an embodiment, an apparatus to enhance detection of particles comprises a memory, and a processor coupled to the memory. The processor has a first configuration to partition a time varying signal into a plurality of segments. The processor has a second configuration to determine a plurality of parameters from the segments. The processor has a third configuration to parse the time varying signal into a plurality of individual particle signal components based on the plurality of parameters.

For an embodiment, an apparatus to mitigate particle measurement errors when performing measurements in a particle field comprises a memory; and a processor coupled to the memory. The processor has a first configuration to receive a time varying signal. The processor has a second configuration to partition the time varying signal into a plurality of timing segments. The processor has a third configuration to locate peak amplitudes in the time varying signal. The processor has a fourth configuration to determine a change in at least one of timing parameters for the plurality of timing segments. The processor has a fifth configuration to identify a plurality of individual particle signal components based at least on the change.

Other features and advantages of embodiments of the present invention will be apparent from the accompanying drawings and from the detailed description that follows below.

BRIEF DESCRIPTION OF THE DRAWINGS

The embodiments of the present invention are illustrated by way of example and not limitation in the figures of the accompanying drawings, in which like references indicate similar elements, in which:

FIG. 5B shows an exemplary embodiment of a time varying signal at a nondense particle condition.

FIG. 5C shows an exemplary embodiment of a time varying signal at a dense particle condition.

DETAILED DESCRIPTION

Figure 1:
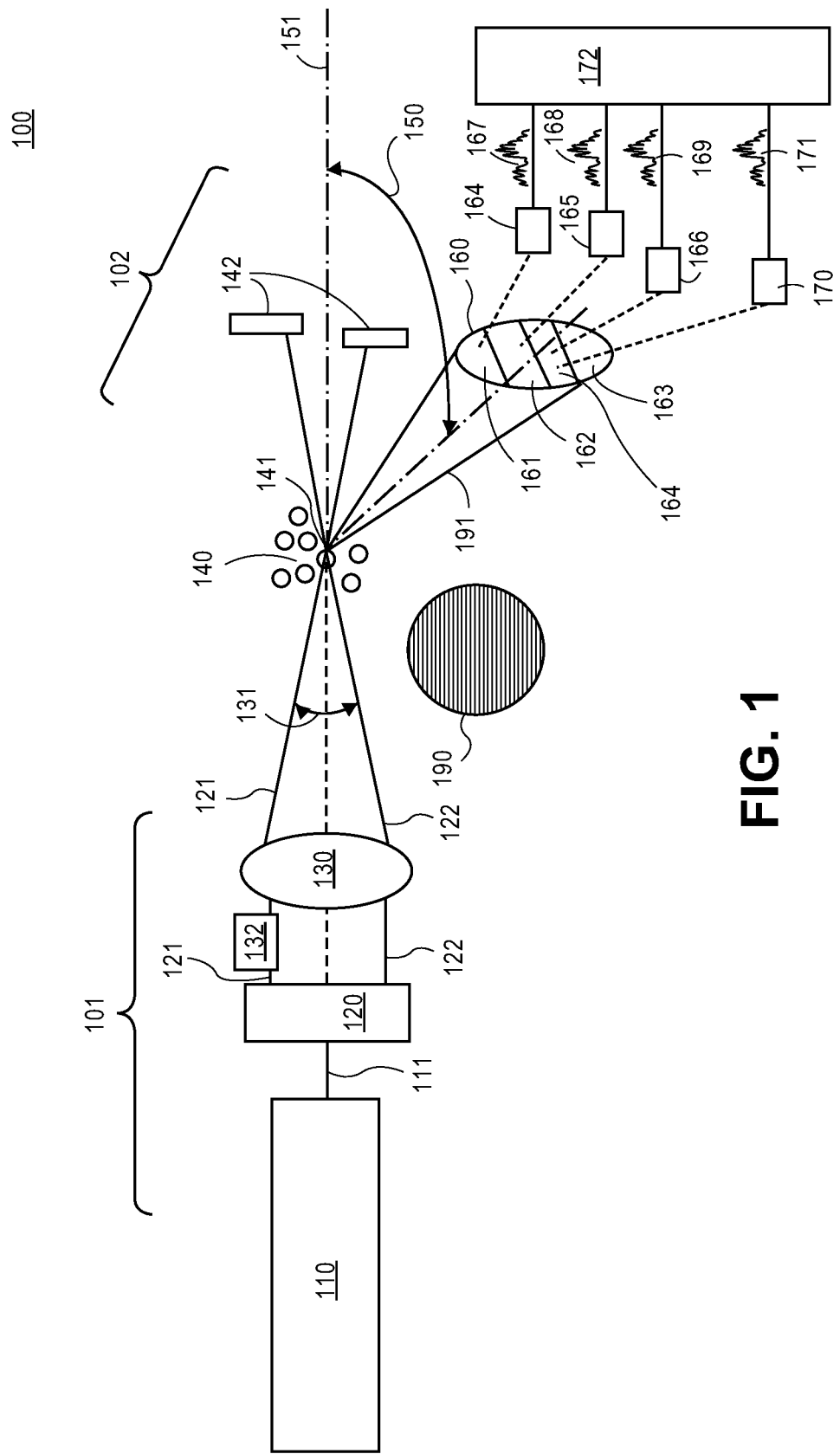
FIG. 1 shows one embodiment of an apparatus to characterize particles in a particle field.

Methods and apparatuses to characterize particles in particle fields are described. Machine-implemented methods and apparatuses are described to automatically detect and measure spherical and nearly spherical particles in a particle field including dense sprays and other particle fields and an optical system to determine sizes of particles, velocities of particles, or both. The term "particle" referred to herein can be a droplet, a bubble, a particle having a spherical shape, a particle having a deformed sphere shape, or any other shapes or near irregularly shaped objects.

In the following description, numerous specific details, such as specific signal processing techniques, system components, etc. are set forth in order to provide thorough understanding of one or more of the embodiments of the present invention. It will be apparent, however, to one of ordinary skill in the art that the one or more embodiments of the present invention may be practiced without these specific details. In other instances, materials, equipment, and other components, have not been described in great details to avoid unnecessarily obscuring of this description. Those of ordinary skill in the art, with the included description, will be able to implement appropriate functionality without undue experimentation.

While certain exemplary embodiments of the invention are described and shown in the accompanying drawings, it is to be understood that such embodiments are merely illustrative and not restrictive, and that the embodiments of the invention are not restricted to the specific constructions and arrangements shown and described because modifications may occur to those of ordinary skill in the art.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "for one embodiment" or "for an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. Those of ordinary skill in the art will recognize that the embodiments of the invention described herein can be practiced with modification and alteration within the spirit and scope of the appended claims. The description is thus to be regarded as illustrative rather than limiting.

For one embodiment, a time varying signal is partitioned into a plurality of segments (e.g., timing segments, frequency segments, or both). A plurality of parameters are determined from the segments. The time varying signal is parsed into a plurality of individual particle signal components (sub-signals) based on the plurality of parameters. The segments can be overlapping, partially overlapping, or both. The segments can have any duration within a sampled record. For at least some embodiments, the segments are separated by time, frequency, phase, or any combination thereof. For at least some embodiments, the individual particle signals that are partially or entirely overlapped by other signals are separated out using an iterative processing technique, as described in further detail below.

Embodiments of methods and apparatuses to characterize particles in particle fields described herein advantageously mitigate particle velocity, particle size, or both particle size and velocity measurement errors and false counting of the particles due to coincidence in particle fields. Based on Poisson statistics which relates to random arrivals of particles, there is a probability of particles passing the measurement region that are very close together and two particles may reside in or pass a sample volume at one time. To avoid errors due to such events, a sampling system with parsing of the signals is advantageously used to separate the signals under coincident events into individual signals from each of the particles. The information for these individual particles is then processed to produce frequency and phase for each individual signal that subsequently leads to the velocity and size of each particle. In alternative embodiments, the signal amplitude can be used to obtain information on the particle size. These signals can be similarly parsed to separate the individual signals and reconcile the size and velocity of each particle producing the signals.

Individual particles under spray or particle field conditions are detected and measured. Generally, a dense particle condition is defined by a number of particles in a unit volume (e.g. particles per cubic centimeter). For an embodiment, a dense particle condition refers to a condition when a number of particles passing through or residing in a sample volume during a measurement time has a significant probability for occurrences being is greater than one. For an embodiment, a nondense particle condition refers to a condition when a number of particles passing through or residing in a sample volume during a measurement time has a low probability of being greater than one.

For at least some embodiments, a sampling system with parsing of the signals into individual particle signal components as described herein provides an advantage as it mitigates measurement errors for laser Doppler velocity, phase Doppler interferometry (also referred to as a phase Doppler anemometry, a particle dynamics analyzer, a phase Doppler particle analyzer) measurements to determine turbulence, light scattering measurements to determine a particle size, and other measurements of particle size distributions, particle size, particle velocity, or both. Embodiments of methods and apparatuses to characterize particles in particle fields as described herein also apply to other particle measurement instruments that rely on measuring a single particle at one time known as single particle counters. For at least some embodiments, these particle measurement instruments are used to measure the light scattering intensity produced by individual particles to produce information on particle size.

Embodiments of methods and apparatuses to characterize particles in particle fields as described herein also can be applied to other single particle counting methods which use, for example, light scattering intensity measured from particles passing through a focused laser beam to determine the particle size. In this case, the particles can be spherical or nonspherical. Nonetheless, these methods depend on there being a high probability of only one particle in the measurement volume at one time if accurate measurements are to be made.

For another embodiment, a resultant fast Fourier transform (FFT) of the record containing information about the light scattered from two or more particles passing through the measurement volume at different velocities has two or more peaks representing the passage of the particles. A portion of the transform containing a given peak is numerically filtered out, the window function of the transform containing the given peak is estimated, and the given peak is removed from the record. For another embodiment, for a record of many particle transits, the time record is sub-sampled to provide a signal-to-noise ratio (SNR) optimization of the start time and stop time of each particle. After removing the (broadened) signal from the FFT the remaining raw signal can be reprocessed to look for more particle transits that may have partially- or wholly-overlapped the removed signal. That is, in a normal sampling mode, instead of rejecting the signals from multiple particles based on a SNR the record can be frequency filtered around multiple peaks to separate out the contributions of each particle.

FIG. 1 shows one embodiment of an apparatus to characterize particles in a dense particle field. An apparatus 100 comprises a transmitter system 101 and a receiver system 102. Transmitter system 101 includes a laser 110 that generates a laser beam 111, a beam splitter 120 and a focusing optics 130. As shown in FIG. 1, laser beam 111 is split by beam splitter 120 into two beams of about the same intensity, e.g., a laser beam 121 and a laser beam 122. For at least some embodiments, laser beam 121 and laser beam 122 are separate and substantially equal laser beams. As shown in FIG. 1, focusing optics 130 comprising one or more lenses, focuses the beams 121 and 122 and causes them to cross each other at an angle 131 to form a sample volume 141. For one embodiment, the laser beams 121 and 122 passing through the focusing optics 130 have substantially similar frequencies. An enlarged view of one embodiment of the interference fringe pattern formed by the crossing beams is shown in an insert 190. The sample volume is defined by the overlap region of the two laser beams which cross each other at an angle 131, as shown in FIG. 1. The angle 131 depends on the size range of the particles to be measured. Increasing the angle increases the difference between the phases of the light scattered by refraction and reflection, allowing more effective discrimination between refraction and reflection components by the scattered light. For one embodiment, the angle formed by the crossing beams is in an approximate range of 1 to 20°. For alternative embodiments, the angle formed by the crossing beams can be any angle. Each of the laser beams 121 at the overlap region has a Gaussian or other light intensity profile. For one embodiment, beam splitter 120 and focusing optics 130 of the transmitter system are commercially available optical components known to one of ordinary skill in the art of optical transmitter manufacturing.

For an embodiment, the beam splitter comprises a frequency shifting device e.g., a Bragg cell to shift the frequency of at least one of the laser beams. For another embodiment, one of the laser beams is passed through a frequency modulator 132 to produce a frequency shift whereas a second one of the laser beams passes through the device without modulation. The frequency shifting is used to compress the frequency dynamic range and resolve the direction ambiguity that would occur for particles passing in a reverse direction, for example. For one embodiment, the frequency of the modulator to modulate the laser beam is in an approximate range of 20 to 60 Megahertz ("MHz"). For another embodiment, the frequency shift may be generated by a rotating grating to shift the frequency in the range of 1 kHz to 20 MHz. The modulator used to modulate one of the laser beams is an acoustic optical modulator known as a Bragg cell. Bragg cells and spinning diffraction gratings are known to one of ordinary skill of optical transmitter manufacturing.

For at least some embodiments, an optical receiver collecting optics 160 is positioned at a detection angle 150 from the transmitted beam direction. For one embodiment, the detection angle 150 is an off axis detection angle and is in an approximate range of 20 to 70° from a direction 151 of the transmitted beams. In one embodiment, the detection angle 150 is in an approximate range of 130 to 160 degrees from the direction 151 of the transmitted beams. In alternative embodiments, the light scatter detection angle 150 is centered at about 0 degree, about 180 degrees, or any other angle relative to the transmitted beam direction 151. In one embodiment, the collecting optics 160 is positioned to detect the scattered light in a forward scatter light direction. In another embodiment, the collecting optics 160 is positioned to detect the scattered light in a backscatter light direction. The light from the crossing beams 121 is scattered by one or more particles 140 passing through the sample volume 141 located at the intersection of the beams 121. The light 191 from each of the two laser beams 121 scattered from one or more particles 140 by various light scattering mechanisms (e.g., refraction and reflection) interfere to form a spatially and temporally varying interference fringe pattern as shown in insert 190 on the plane of the collecting optics 160. The collecting optics 160 of the receiver system 102 collect the interference fringe pattern formed by the scattered light 191, partitions the interference fringe pattern into three or more portions, e.g., portions 161, 162, 163 and 164, and directs them to at least two spaced apart photodetectors, e.g., photodetectors 164, 165, 166 and 170 of the receiver system 102. Each of the photodetectors receives respective portion of the interference fringe pattern produced by the light scattered from one or more particles 140. For one embodiment, the photodetectors are located in the interference fringe pattern, or an image of it, and the separation between the detectors is known.

When a particle is moving, the Doppler shift in the frequency of the scattered light occurs. The difference in the Doppler frequency shift between the light scattered from each of the beams 121 causes the fringe pattern to appear to move. As interference fringe pattern sweeps past the photodetectors 164, 165, 166 and 170 at the Doppler difference frequency, each of the photodetectors produces a time varying signal, such as a signal 167, a signal 168, a signal 169 and a signal 171. When the light received by the photodetectors is scattered from a particle due to a single dominant light scattering mechanism, e.g., either refraction or reflection, the interference fringe pattern is periodic—e.g., a sinusoidal wave signal.

The periodic interference pattern that sweeps past each of the photodetectors at the Doppler difference frequency produces signals that are identical in frequency, but shifted in phase. The phase shift ϕ is related to the spacing of the scattered fringe pattern through the following relationship:

$$\frac{\phi}{360°} = \frac{s}{\Lambda} \quad (1)$$

where s is a spacing between the photodetectors; ϕ is a phase shift between the signals from respective photodetectors, Λ is a spacing (a spatial period) between the fringes of the interference fringe pattern produced by the scattered light at the location of the photodetectors and is inversely proportional to the diameter of the particle.

For one embodiment, the particle's size is an approximate range of 0.2 to 1500 μm in diameter, for example. To measure a velocity component, any one of the photodetectors of the receiver system 102 can be used. For one embodiment, a small aperture (not shown) is used in the receiver system 102 to allow only light scattered by particles passing a small region of the laser beam intersection to reach the photodetectors. The remainder of the scattered light is blocked by a material 142 outside of the aperture to limit only the detection of particles passing the measurement volume. The small aperture (not shown) is used in the receiver system 102 to minimize the noise in the signal and limit the size of the measurement volume.

For an embodiment, three or more photodetectors are used to resolve possible phase ambiguity, to extend the measurement range and resolution, and to validate each of the time varying signals for determining the size and velocity of the particles. As shown in FIG. 1, each of the photodetectors sends a time varying electrical signal associated with one or more particles to a signal processing system 172 to perform methods to parse an extended signal from particles under dense particle condition into individual particle signal components as described in further detail below.

For an embodiment, four photodetectors are used to further qualify individual particle signal components. For an embodiment, three detectors are used to measure the phase shift of the scattered light interference fringe pattern to extract signal Doppler difference frequency and phase from the signals which is then used to determine the particle velocity and size. Three detectors allow two independent phase measurements that can be used to validate the signals and remove errors due to mixed scattering from refraction and reflection or other sources that may otherwise corrupt the signals. The addition of a fourth detector provides three phase shift measurements that may be used to further validate the signals. Such conditions exist, for example, under aircraft icing particle measurement applications where some of the particles may be frozen ice crystals whereas other particles comprise spherical or nearly spherical droplets. Characterizing the particles using four photodetectors, such as photodetectors 164, 165, 166 and 170 is advantageous, as it provides separation of the liquid and solid phase particles. The use of four detectors expedites the particle characterization process, increases the reliability of the measurements, and separates the liquid and solid particles.

Figure 2:
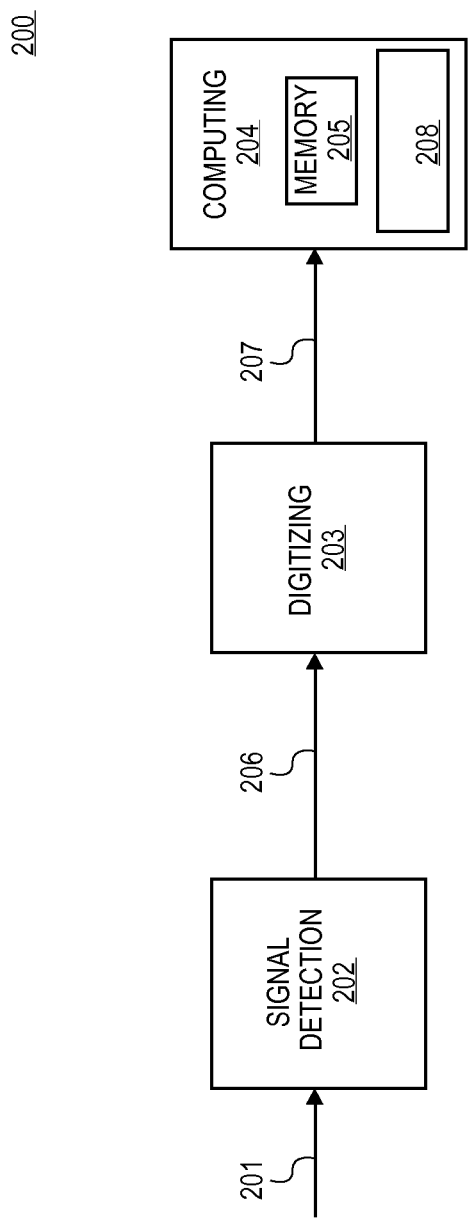
FIG. 2 shows one embodiment of a system to characterize particles under particle field conditions.

FIG. 2 shows one embodiment of a system 200 to characterize particles under dense particle field conditions. For one embodiment, system 200 represents receiver system 102. As shown in FIG. 2, system 200 includes a signal detector section 202, a digitizing section 203, and a computing section 204. The signal detection section 202 comprises one or more photodetectors, e.g., the photodetectors as depicted in FIG. 1 to convert light scattered from two intersecting laser beams by one or more particles into electrical signals. For one embodiment, the signal detection section 202 further comprises a high pass filter, a frequency mixer and a low pass filter coupled to the one or more photodetectors.

For one embodiment, digitizing section 203 comprises one or more high speed analog-to-digital converters (ADCs). For an embodiment, computing section comprises a memory 205 coupled to one or more processors, such as a processor 208. As shown in FIG. 2, optical signals 201 from one or more particles are detected by the photodetectors (not shown) of signal detector section 202, converted to electrical signals 206 and passed to digitizing section 203. For one embodiment, the optical signals 201 are Doppler signals. For one embodiment, the optical signals 201 are produced by particles passing through an intersection of two laser beams that form an interference fringe pattern. For one embodiment, electrical signals 206 are analog signals. For an embodiment, the analog electrical signals are digitized by digitizing section 203 to produce digitized signals 207 that are digital replicas of the original analog signals. For an embodiment, digitized signals 207 are digital replicas of the analog Doppler signals.

The digitized signals 207 are sampled signals. For an embodiment the digitized signal produced by the digitizing section 203 comprises at least 256 samples. For an embodiment the digitized signal produced by the digitizing section 203 comprises at least 512 samples. For an embodiment, the digitized signal produced by the digitizing section 203 comprises a number of samples determined based on the duration of the signal, the sampling frequency, or both. For an embodiment, the digitized signal produced by the digitizing section comprises 100,000 or more samples.

The digitized signals 207 are passed to computing section 204. The digitized signals 207 are stored in memory 205 as records. For an embodiments, one or more processors of computing section 204 process the digitized signals 207 by performing a discrete Fourier transform using a fast Fourier transform (FFT) algorithm to define a frequency, a phase, or both. For alternative embodiments, one or more processors of computing section 204 process the digitized signals 207 using autocorrelation, wavelets, or other computing algorithm to define a frequency, a phase, or both. For one embodiment, the fast Fourier transform (FFT) algorithm is used to process the sampled signals and obtain the signal frequency, the phase shift, or both relative to a common datum. For one embodiment, frequency interpolation is used to increase the resolution of the discrete sampled signals. For an embodiment, signal detection section 202, digitizing section 203, and computing section 204 are used to reliably detect and record ADC samples of the Doppler signals produced from overlapping particles. These samples are then processed using the fast Fourier transform, autocorrelation, wavelets, or other algorithms to determine the signal frequency.

Generally, particles under dense particle conditions and also, less frequently, even in dilute particle field conditions, may produce contiguous or overlapping signals. These signals are parsed into individual signals identified with individual particles. Identification of the individual signals during the parsing process involves determining parameters of an extended digitally recorded signal. The extended digitally recorded signal is a digital replica of an analog signal converted from an optical signal obtained from the particles. Determining parameters of an extended digitally recorded signal involves locating the peak amplitudes of the individual signals, determining changes in frequency, changes in phase shift, expected particle transit time and other information from the extended digitally recorded signal. The extended digitally recorded signal is separated into the individual signals produced by the individual particles based on the determined parameters, as described in further detail below. In this way, the individual signals can be advantageously identified and reliably processed to extract the maximum amount of information, even under dense spray conditions.

For one embodiment, the signal detection involves detecting the Doppler burst signals based on their sinusoidal character and signal-to-noise ratio. For an embodiment, the signals are sampled with high-speed analog-to-digital converters (ADCs) with up to 100,000 or greater samples in the record. The number of samples recorded depends upon the duration of the signal and the sampling rate. When more than one particle passes the sample volume at one time, the analog signals may be contiguous or partially overlapping. When the spray or particle field is very dense (substantially high numbers of drops per cubic centimeter), there can be a number of particles that are nearly contiguous and hence, produce overlapping signals. The existing detection tools may regard these contiguous signals or samples as a single signal. For an embodiment, these contiguous signals are sampled over the duration of the detection and the sampled information is passed to the computing section 204. For an embodiment, information on the signal amplitudes including the peak amplitudes is recorded with a high resolution, high quantization ADC or other techniques. This recording provides reliable replica of the signal amplitude and frequency information. Hardware, software, or both are used to parse the signals into individual signals from individual particles, as described in further detail below.

For one embodiment, a long record of the contiguous and overlapping signals is received by a processor 208 and the information on the signal frequency, phase, and amplitude are provided to a processing algorithm. The contiguous and overlapping signals are then parsed into individual signals using the signal amplitude, frequency, phase, and expected transit time. This process can be done iteratively with the signals being reprocessed several times to extract and then test and refine the extraction of the individual signals produced by the individual particles. The individual signals are then processed to determine the signal frequency, phase, or both to extract the particle velocity, particle size, or both. For an embodiment, signal amplitude information is used for the signal validation, as described in further detail below.

System 200 is set up to consistently detect and provide accurate measurements of the particle velocity and size with predictable measurement uncertainty. In existing systems that measure the particle velocity, the particle size, or both, the assumption is that there is just one particle in the measurement volume at one time. Even for relatively dilute sprays, this condition can be violated, albeit infrequently.

As the number density of the spray increases such as in the case of diesel and gasoline direct injection sprays, the probability of more than one droplet residing in the measurement volume at one time increases which, consequently, increases the measurement uncertainty and error. The signal detection section 202 of FIG. 2 remains activated and the digitizing section 203 records a long record of the incoming signal representing many particles. For example, the digitizing section can record 100,000 or more digital conversion samples. This long record is then parsed to identify the individual particle signal components within the long record. The individual particle signal components are then processed to obtain signal frequency, signal phase, or both which are related to the particle velocity and size. A portion of the electrical signals from the photodetectors of the signal detection section 202 is used to measure the peak amplitude and average power to adjust the gain of the photodetectors, and a portion of the electrical signals from the photodetectors of the signal detection section 202 is fed to digitizing section 203.

Signal detection section 202 has two outputs. For example, electrical signals from one output (not shown) are used to measure peak amplitude and average power to adjust the gain of the photodetectors and electrical signals 206 from other output are fed to digitizing section 203.

Figure 3:
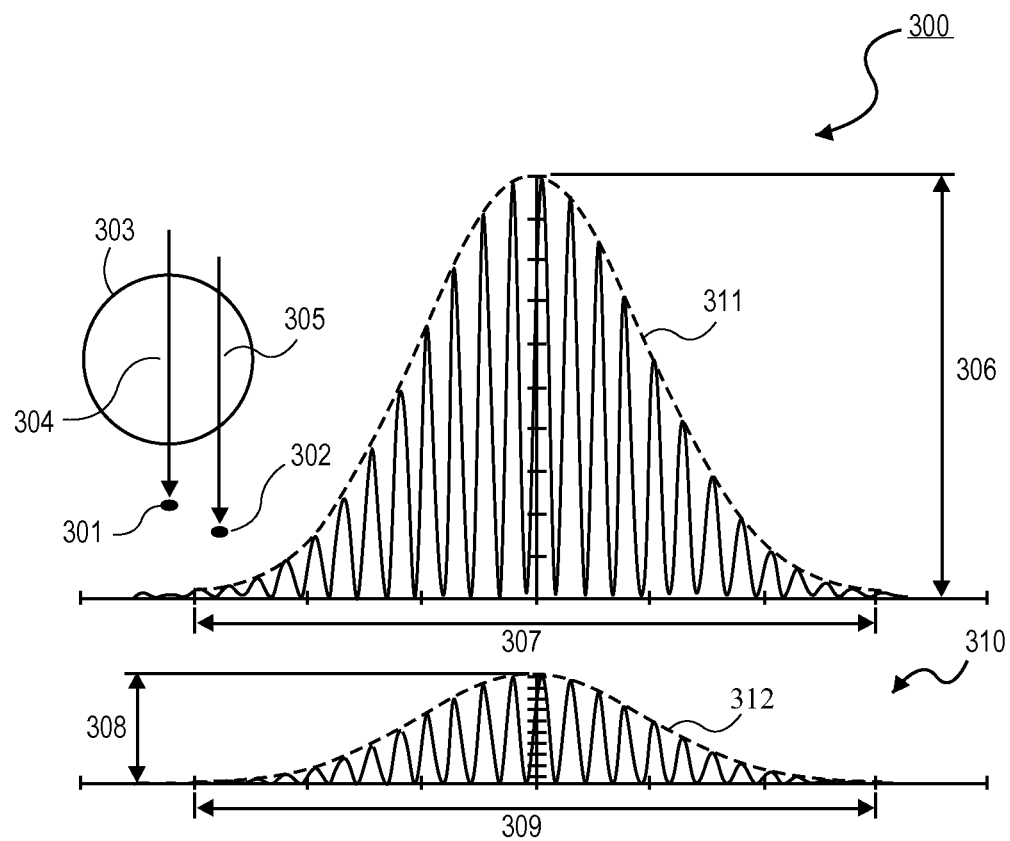
FIG. 3 shows a Doppler burst signal from a particle and a Doppler burst signal from a particle passing on a different trajectory through a laser beam.

FIG. 3 shows a Doppler burst signal 300 from a particle 301 and a Doppler burst signal 310 from a particle 302. Particle 301 passes through a center portion 304 and particle 302 passes at an edge portion 305 away from the center portion 304 of a sample volume 303. For an embodiment, the sample volume 303 represents the sample volume 141 as depicted in FIG. 1. As shown in FIG. 3, burst signal 300 has an envelope 311, a peak amplitude 306, and a width 307. Burst signal 310 has an envelope 312, a peak amplitude 308, and a width 309. For an embodiment, the envelope of the burst signal has a Gaussian shape. For another embodiment, the envelope of the burst signal has the shape other than a Gaussian shape. As shown in FIG. 3, Doppler burst signal 300 is greater than Doppler burst signal 310. For an embodiment, the particle 301 has the size similar to particle 302.

As shown in FIG. 3, each of the burst signals 300 and 310 is modulated by a sinusoidal wave. Optical frequency shifters—e.g., Bragg cells—are used to modulate the frequency of the burst signal. For an embodiment, modulating the burst signal frequency is used to detect the direction of motion of particles and to reduce the relative frequency range of the burst signals. The Doppler frequency shift is determined by the droplet velocity component in the plane of two crossing laser beams. The frequencies of the signal bursts are determined by the sum of the Doppler frequency shift and the frequency of the optical shifter. For an embodiment, a transit time $\tau$ of a particle is determined from the width of its burst signal.

Figure 4:
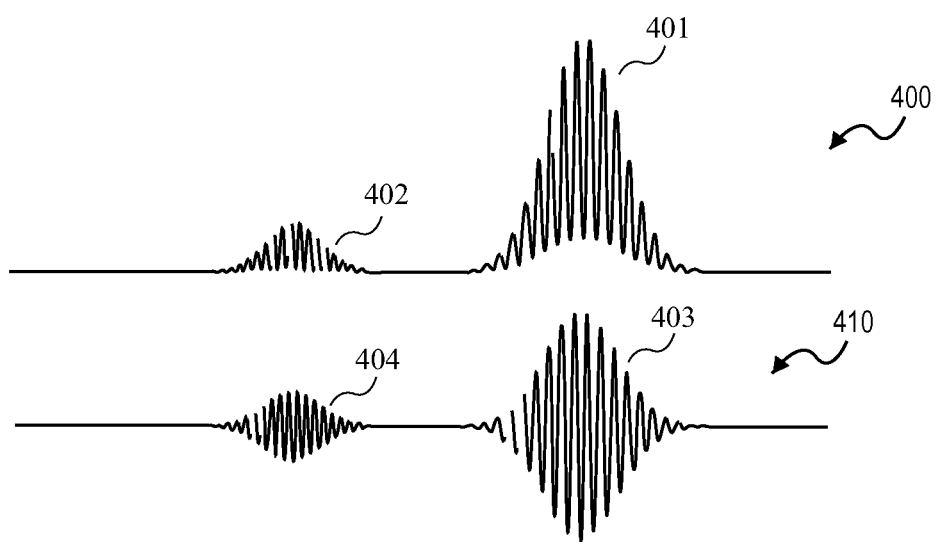
FIG. 4 shows examples of raw Doppler burst signals and filtered Doppler signals before digitizing under a noncoincident particle condition.

FIG. 4 shows examples of raw Doppler burst signals 400 and filtered Doppler signals 410 before digitizing under a nondense particle condition. As shown in FIG. 4, raw Doppler signal 401 from a first particle is well separated from raw Doppler signal 402 from a second particle. As shown in FIG. 4, filtered Doppler signal 403 from the first particle is well separated from filtered Doppler signal 404 from the second particle.

Figure 5A:
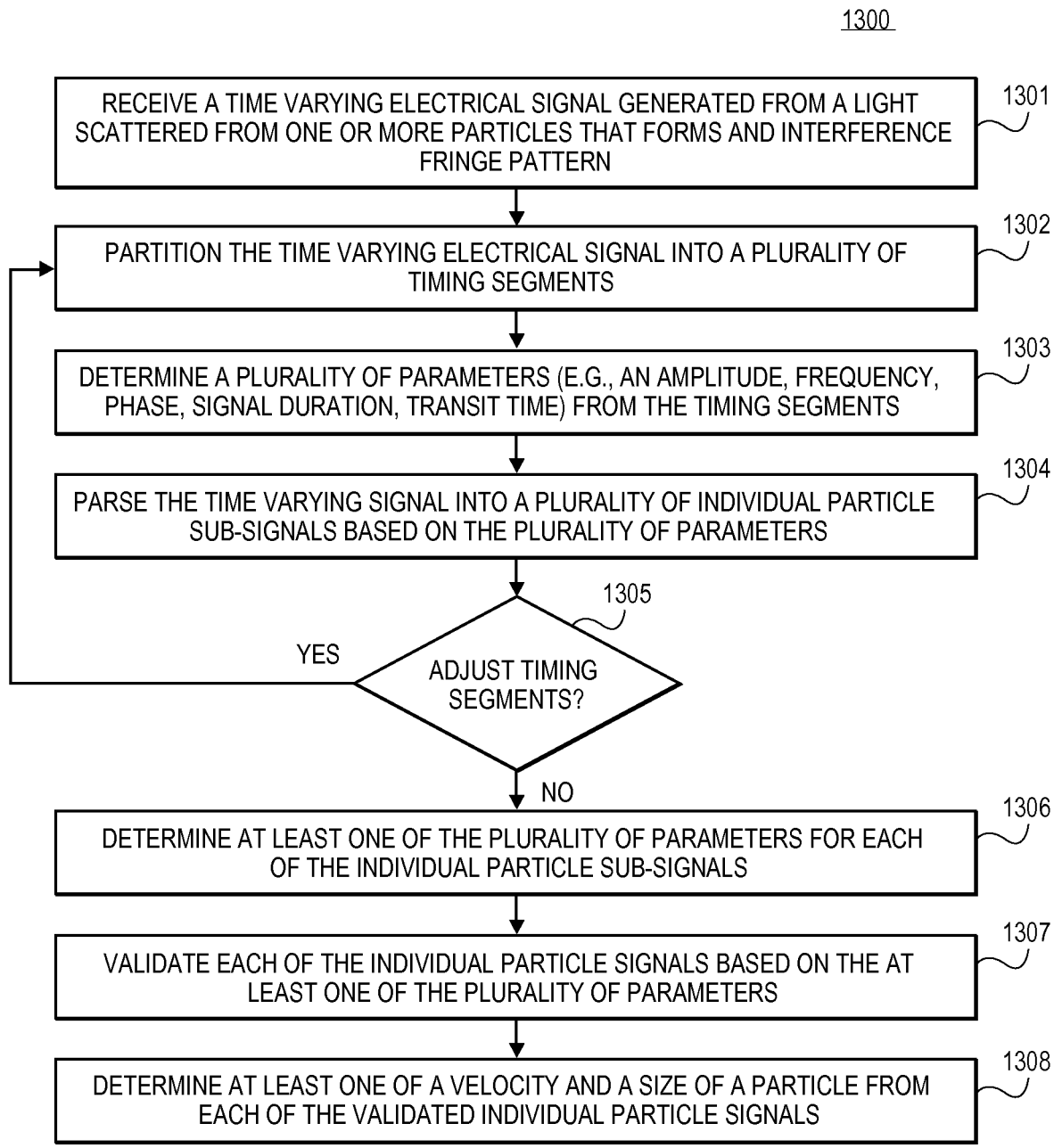
FIG. 5A is a flow chart of one embodiment of a method to enhance detection of particles.

FIG. 5A is a flow chart of one embodiment of a method 1300 to enhance detection of particles. Method 1300 starts with operation 1301 that involves receiving a time varying electrical signal generated from a light scattered from one or more particles that forms an interference fringe pattern. Interference fringe patterns, such as the interference fringe pattern shown in insert 190 formed by spherical or quasi-spherical particles passing through the beam intersection and scattering light is received by the photodetectors, e.g., the photodetectors shown in FIG. 1. In response, the photodetectors generate time varying electrical signals, e.g., signals 501 and 510 shown in FIGS. 5B and 5C.

FIG. 5B shows an exemplary embodiment of a time varying signal 501 at a nondense particle condition. Time varying signal 501 comprises individual particle signal components having peak amplitudes 503, 504 and 505. As shown in FIG. 5B, the individual particle signal components having peak amplitudes 503, 504 and 505 are separate signals that do not coincide. For an embodiment, the individual particle signal components having peak amplitudes 503, 504 and 505 are signals formed by individual particles.

FIG. 5C shows an exemplary embodiment of a time varying signal 510 at a dense particle condition. Time varying signal 510 comprises peak amplitudes 511, 512, 513, 514 and 515. As shown in FIG. 5C, the individual particle signal components having peak amplitudes 511 and 512 partially coincide (overlap) to form a contiguous signal, and the individual particle signal components having peak amplitudes 513, 514 and 515 partially overlap to form a contiguous signal. For an embodiment, the individual particle signal components having peak amplitudes 511, 512, 513, 514 and 515 are phase Doppler signals. For an embodiment, the peak amplitudes of the time varying signals, such as the peak amplitudes 503, 504 and 505 511, 512, 513, 514 and 515 are identified in the time varying signal. For an embodiment, the peak amplitudes of the time varying signals are recorded in a memory.

Referring back to FIG. 5A, at operation 1302 the time varying electrical signal is partitioned into a plurality of timing segments. Referring back to FIG. 5B, a portion 502 of time varying signal 501 is partitioned into a timing segment $T_{1-1}$ and a timing segment $T_{1-2}$. Referring back to FIG. 5C, a portion of time varying signal 510 is partitioned into a timing segment $T_{2-1}$ and a timing segment $T_{2-2}$. For alternative embodiments, the number of timing segments into which the time varying electrical signal is partitioned can be any number greater than one. For another embodiment, the time varying signal 501 is partitioned into a plurality of frequency segments. For yet another embodiment, the time varying signal 501 is partitioned into a plurality of phase segments.

Referring back to FIG. 5A, at operation 1303 a plurality of parameters (e.g., an amplitude, a frequency, a phase, a signal duration, an expected particle transit time based on a beam diameter and a particle velocity) are determined from the timing segments. Referring back to FIG. 5B, a phase $\varphi_{1-1}$ and a frequency $f_{1-1}$ are determined from timing segment $T_{1-1}$, and a phase $\varphi_{1-2}$ and a frequency $f_{1-2}$ are determined from timing segment $T_{1-2}$. Referring back to FIG. 5C, a phase $\varphi_{2-1}$, a frequency $f_{2-1}$, or both phase $\varphi_{2-1}$ and frequency $f_{2-1}$ are determined from timing segment $T_{2-1}$, and a phase $\varphi_{2-2}$, a frequency $f_{2-2}$, or both phase $\varphi_{2-2}$ and frequency $f_{2-2}$ are determined from timing segment $T_{2-2}$. To separate the signals from individual particles, segments of the sampled signal are interrogated and parsed to locate the individual signals. For an embodiment, a change in at least one of the parameters is determined for the time varying signal. For one embodiment, the segments are contiguous during the parsing operation. For another embodiment, the segments are overlapping during the parsing operation.

Timing segments of the time varying electrical signals are identified as components of a periodic signal from a single particle if a timing parameter difference between the timing segments is less or equal to a timing parameter error threshold.

As shown in FIG. 5B, the difference between the phase determined from the timing segment T1-1 and the phase $\varphi_{1-2}$ determined from the timing segment T1-2 is less or equal to a phase error threshold, so that is substantially similar to $\varphi_{1-2}$. The difference between the frequency $f_{1-1}$ determined from the timing segment T1-1 and the frequency $f_{1-2}$ determined from the timing segment T1-2 is less or equal to a frequency error threshold, so that $f_{1-1}$ is substantially similar to $f_{1-2}$. The timing segment T1-1 and timing segment T1-2 are identified as components of a periodic signal from a single particle.

The timing segments of the varying electrical signals are not identified as components of a periodic signal from a single particle if the timing parameter difference between the timing segments is larger than the timing parameter error threshold. The timing segments may be due to more than one particle passing the measurement volume or beam intersection at one time.

As shown in FIG. 5C, the difference between the phase $\varphi_{2-1}$ determined from the timing segment T2-1 and the phase $\varphi_{2-2}$ determined from the timing segment T2-2 is greater than a phase error threshold, so that $\varphi_{2-1}$ and $\varphi_{2-2}$ are not similar. The difference between the frequency $f_{2-1}$ determined from the timing segment T2-1 and the frequency $f_{2-2}$ determined from the timing segment T2-2 is greater than a frequency error threshold, so that $f_{2-1}$ and $f_{2-2}$ are not similar. For an embodiment, timing segment T2-1 and timing segment T2-2 are identified as components of a signal from a plurality of particles passing the measurement volume or beam intersection at a time. For an embodiment, timing segment T2-1 having peak amplitude 511 is identified as a sub-signal from one particle, and timing segment T2-2 having peak amplitude 512 is identified as a sub-signal from another particle.

Referring back to FIG. 5A, at operation 1304 the time varying signal is parsed into a plurality of individual particle signal components based on the plurality of parameters. As shown in FIG. 5C, the time varying signal 510 is parsed into a plurality of individual particle signal components 516, 517, 518, 521 and 522. As shown in FIG. 5C, individual timing components 521 and 522 include an overlap region 524. At operation 1305 it is determined if the timing segments need to be adjusted. If the timing segments need to be adjusted, method 1300 returns back to operation 1302. The operations 1302 to 1304 are repeated iteratively for the adjusted timing segments until the plurality of individual particle signal components are identified. For an embodiment, peak amplitudes (e.g, peak amplitudes 511 and 512) and valleys (e.g., a valley 523) in the time varying signal are located. The timing segments are adjusted based on the located peak amplitudes to capture durations of the individual particle signal components. A timing segment is adjusted to have a center at the peak amplitude to capture a duration of an individual particle signal component. For an embodiment, the separation need not be made just on timing segments. For an embodiment, overlapping times and frequency are used to separate different individual particle signal components. A start time and a stop time of each of the individual particle signal components are determined based on the valleys in the time varying signal. For one embodiment, a timing segment T2-1 is adjusted based on at least one of the peak amplitude 511 and valley 523 to identify individual particle signal component 521 having a start time t1 and a stop time t2. A timing segment T2-2 is adjusted based on at least one of the peak amplitude 512 and valley 523 to identify an individual particle signal component 522 having to have a start time t3 and a stop time t4. As shown in FIG. 5C, individual particle signal component 521 has start time t1 and stop time t2 and individual particle signal component 522 has start time t3 and stop time t4. For an embodiment, the location of the valley 523 is used to determine end time t2 and a start time t3. For an embodiment, the valley corresponds to the end time of signal component 521 and the start time of the signal component 522, depending on how far apart these signal components are in time.

If the timing segments do not need to be adjusted, at least one of the plurality of parameters for each of the individual particle signal components is determined. The parsed signals are processed to determine one or more timing parameters—e.g., a phase, a frequency, signal duration, particle transit time, and other timing parameters. At operation 1307 each of the individual particle signal components are validated based on the at least one of the plurality of parameters, as described in further detail below with respect to FIG. 8B.

For an embodiment, three or more photodetectors are used to validate the parsed signals for determining the size and velocity of the particles, as described above with respect to FIG. 1. For an embodiment, the parsed signals are validated using comparisons between signals from the different pairs of detectors, signal-to-noise ratio, consistency of frequency and phase, and signal duration or transit time through the measurement volume and amplitude information. To identify the individual signals, the signal amplitude is recorded for the detected particles and is used to identify individual signals by locating the peaks in signal amplitude, changes in frequency, changes in phase shift, and signal duration. A signal-to-noise ratio for each of the photodetectors is determined as a part of the individual signal qualifications. Each of the individual particle signal components is validated for determining the size and velocity of a particle based on the signal-to-noise ratio of each of the photodetectors. If there is more than one particle in the measurement volume at one time, the region of signal overlap may result in a reduced signal-to-noise ratio which could result in the particles being rejected. This is not a favorable condition because it can bias the measurements. Method 1300 continues with operation 1308 that involves determining at least one of a velocity and a size of a particle from each of the validated individual particle signal components. For an embodiment, the velocity and size of the particle is determined using phase and frequency determined from each of the validated individual particle signal components.

When there is more than one particle in the measurement volume, the signals from each particle may be contiguous or overlapping and, consequently, the gate detector may attempt to process the signals as a single signal from an individual particle. Such processing may result in the largest particle being measured while a smaller particle being rejected, or both particles are rejected due to the validation process. Because the laser beams have a Gaussian intensity, it is also possible for the larger particle to pass the sample volume on an edge trajectory whereas the smaller particle may pass through the center of the beam and produce a signal having the amplitude larger than the larger particle. Hence, signal amplitude may not be a reliable parameter for assessing particle size without additional information. For an embodiment, the time varying signal is a sampled signal recorded using a high-speed analog-to-digital converter (ADC). For an embodiment, the amplitude of the time varying signals is recorded using a high quantization ADC sampling system to record the details of the signal amplitude.

For an embodiment, the timing segments of the time varying signal have the same duration. For another embodiment, the timing segments of the time varying signal have different time durations. For an embodiment, the peak amplitudes of the signals are used to identify the centers of the individual signals and the timing segments may be adjusted to capture the durations of the individual signals. The timing segments may be varied and this information processed using a computing system, such as computing system 204 to identify changes in frequency and phase of the signal as a function of time. This information combined with the location of the peaks of the signal amplitudes can be used to parse the signals into signals from individual particles. In addition, the velocity of the particles measured from the signal frequency can be used with the diameter of the measurement volume to estimate an appropriate duration of the time segment to further assist in identifying the signals from individual particles. This process may be repeated iteratively to refine the location and duration of the nonoverlapped time segments of the signals. This approach further refines the identification and measurement of the individual signals.

For one embodiment, the processing of each time segment includes performing a Fourier transform for each timing segment after digitizing the electrical signal. For another embodiment, the timing segment is processed using the Fourier transform techniques to yield the frequency on the timing segment. For another embodiment, the timing segment is processed using a Fourier transform technique to find both the phase and frequency of the timing segment. The Fourier transform technique is known to one of ordinary skill in the art of signal processing. For alternative embodiments, each digitized time segment is processed using autocorrelation, wavelets, or other computing algorithm known to one of ordinary skill in the art of signal processing.

Figure 6A:
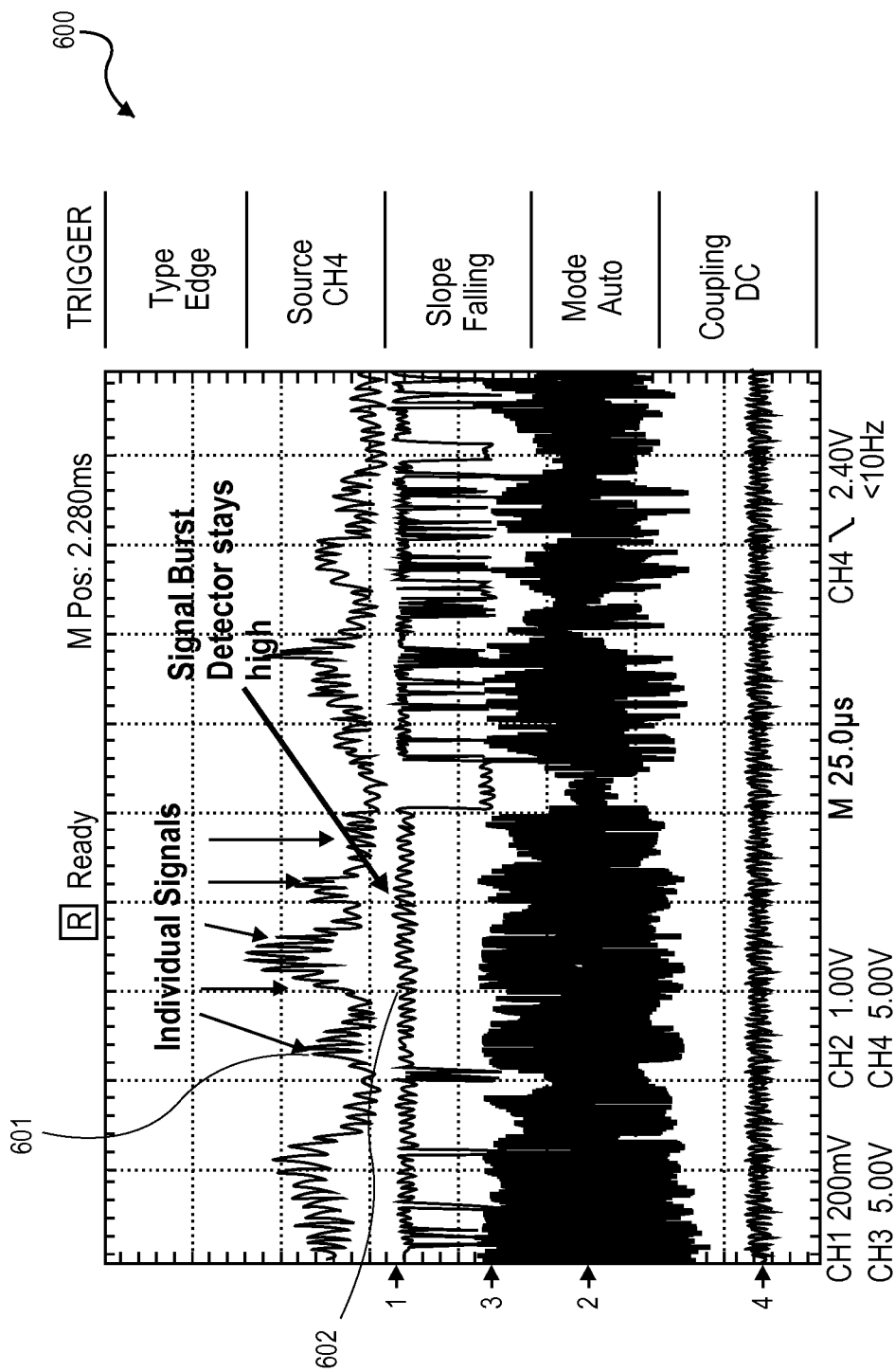
FIG. 6A is a view showing an exemplary embodiment of an oscilloscope trace for a dense particle field with coincident arrivals at a probe volume.
Figure 6B:
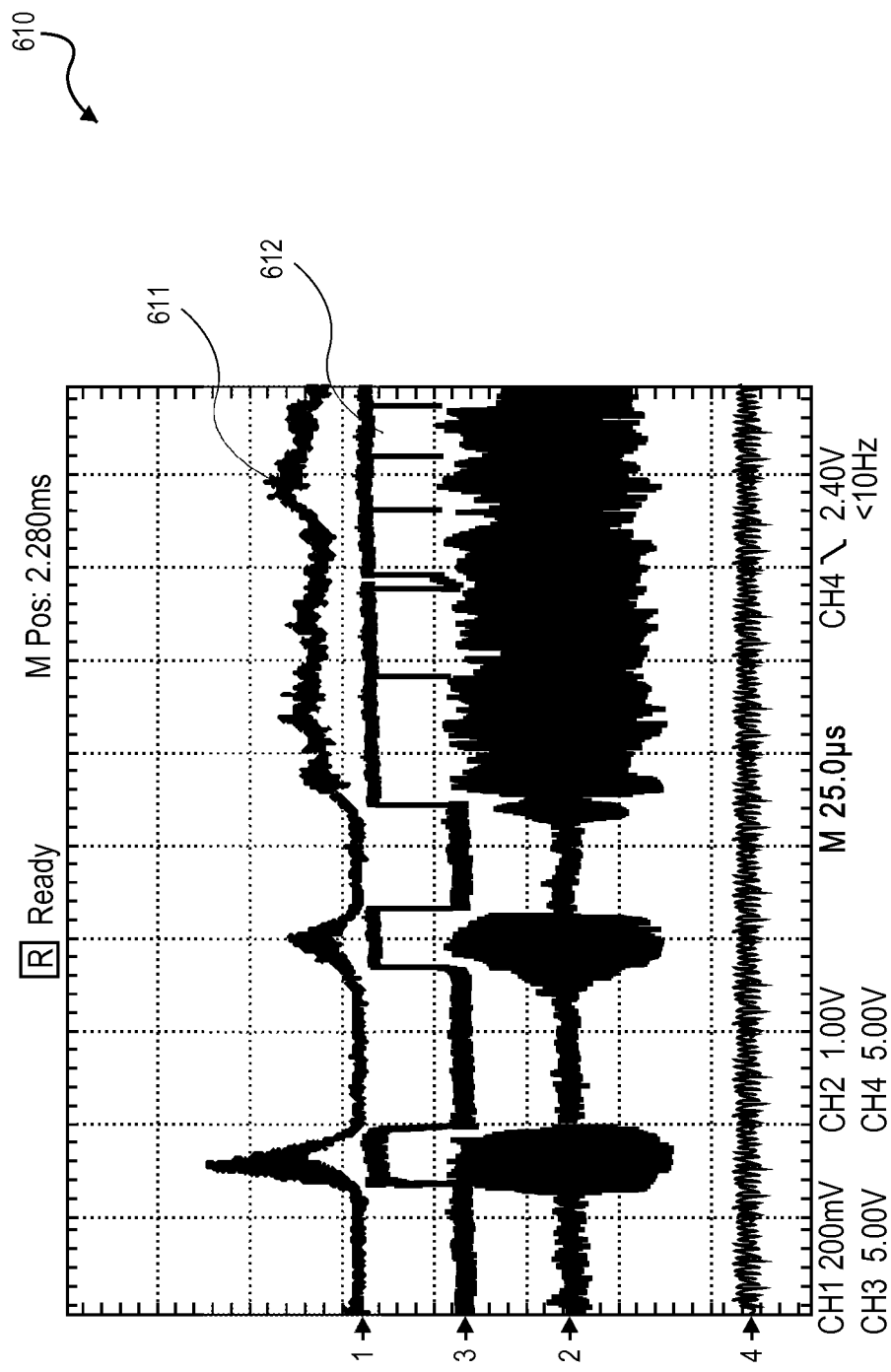
FIG. 6B is a view showing another exemplary embodiment of an oscilloscope trace for a dense particle field.

FIG. 6A is a view 600 showing an exemplary embodiment of an oscilloscope trace for a dense particle field. As shown in FIG. 6A, a contiguous signal 601 comprises multiple overlapping peaks in amplitude. The locations of the peaks in amplitude of the contiguous signal 601 are identified and the peak amplitudes are stored in a memory as records. As shown in FIG. 6B, a burst detector signal 602 continues to stay high during receiving these peaks, so that the burst detector system detects several particles as one detection that leads to particle measurement errors.

FIG. 6B is a view 610 showing another exemplary embodiment of an oscilloscope trace for a dense particle field. As shown in FIG. 6B, a contiguous signal 611 comprises multiple peaks in amplitude. The locations of the peak amplitudes are identified in the contiguous signal 611. The peak amplitudes and their locations in the contiguous signal are stored in a memory as records. As shown in FIG. 6B, a burst detector signal 612 continues to stay high during the peak amplitudes, so that the burst detector system detects several particles as one detection that leads to particle measurement errors.

Figure 7A:
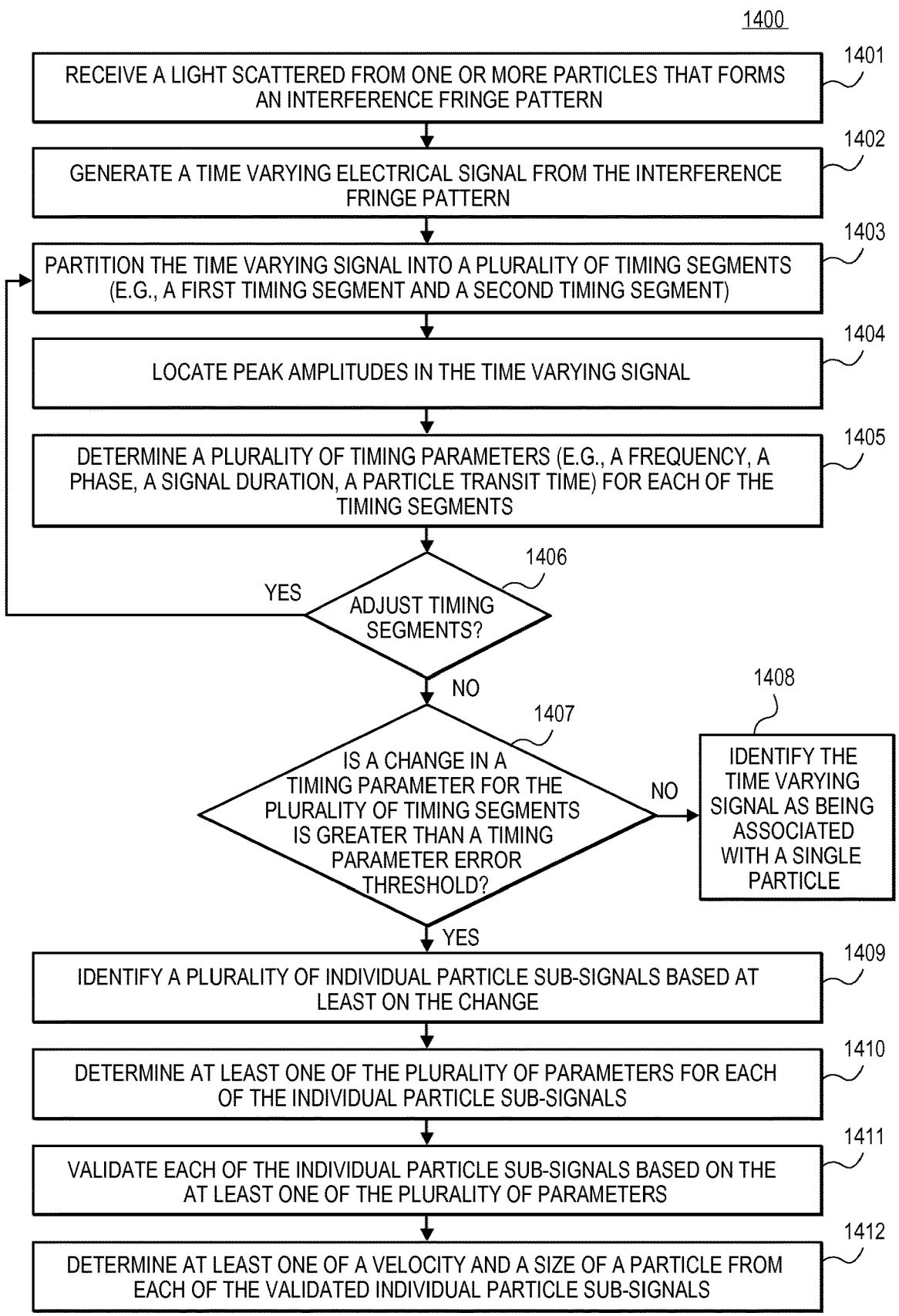
FIG. 7A is a flow chart of one embodiment of a method to mitigate particle measurement errors in a particle field.

FIG. 7A is a flow chart of one embodiment of a method 1400 to mitigate particle measurement errors in a dense particle field. Method 1400 begins with operation 1401 that involves receiving a light scattered from one or more particles that forms an interference fringe pattern, as described above. At operation 1402 a time varying electrical signal is generated from the interference fringe pattern, as described above. At operation 1403 the time varying signal is partitioned into a plurality of timing segments (e.g., a first timing segment and a second timing segment), as described above. For another embodiment, the time varying signal is partitioned into a plurality of frequency segments. For yet another embodiment, the time varying signal is partitioned into a plurality of phase segments. At operation 1404 peak amplitudes are located in the time varying signal. For an embodiment, the peak amplitudes are stored in a memory, e.g., memory 205 shown in FIG. 2A. At operation 1405, a plurality of timing parameters are determined from each of the timing segments. The plurality of timing parameters comprise a frequency, a phase, a signal duration, a particle transit time, or any combination thereof, as described above. At operation 1406 it is determined whether or not timing segments need to be adjusted. If the timing segments need to be adjusted method 1400 returns to operation 1403. A duration of the timing segment is adjusted based on the location of the peak amplitude. For an embodiment, operations 1403, 1404 and 1404 are repeated iteratively for the adjusted timing segments until the plurality of individual particle signal components are identified.

If the timing segments do not need to be adjusted, method 1400 continues with operation 1407 that involves determining if a change in a timing parameter between the timing segments is greater than a timing parameter error threshold. If the change in the timing parameter between the timing segments is not greater than the timing parameter error threshold, the time varying signal is identified as being from a single particle. If the change in the timing parameter between the timing segments is greater than the timing parameter error threshold, at operation 1409 the time varying signal is identified as being from a plurality of particles, and a plurality of individual particle signal components are identified based at least on the change in the timing parameter, as described above. For one embodiment, an estimated particle transit time is determined, and the plurality of individual particle signal components are identified based at least in part on the estimated transit time. For another embodiment, a duration of the time varying signal is determined, and the plurality of individual particle signal components are identified based at least in part on the duration of the time varying signal.

At operation 1410 a plurality of parameters (e.g., a frequency, a phase, a signal duration, a particle transit time, or any combination thereof) for each of the individual particle signal components are identified. At operation 1411 each of the individual particle signal components are validated based on the at least one of the plurality of parameters, as described in further detail below with respect to FIG. 8B. At operation 1412 at least one of a velocity and a size of a particle is determined from each of the validated individual particle signal components. For an embodiment, the velocity and size of the particle is determined using phase and frequency determined from each of the validated individual particle signal components, as described above.

Figure 7B:
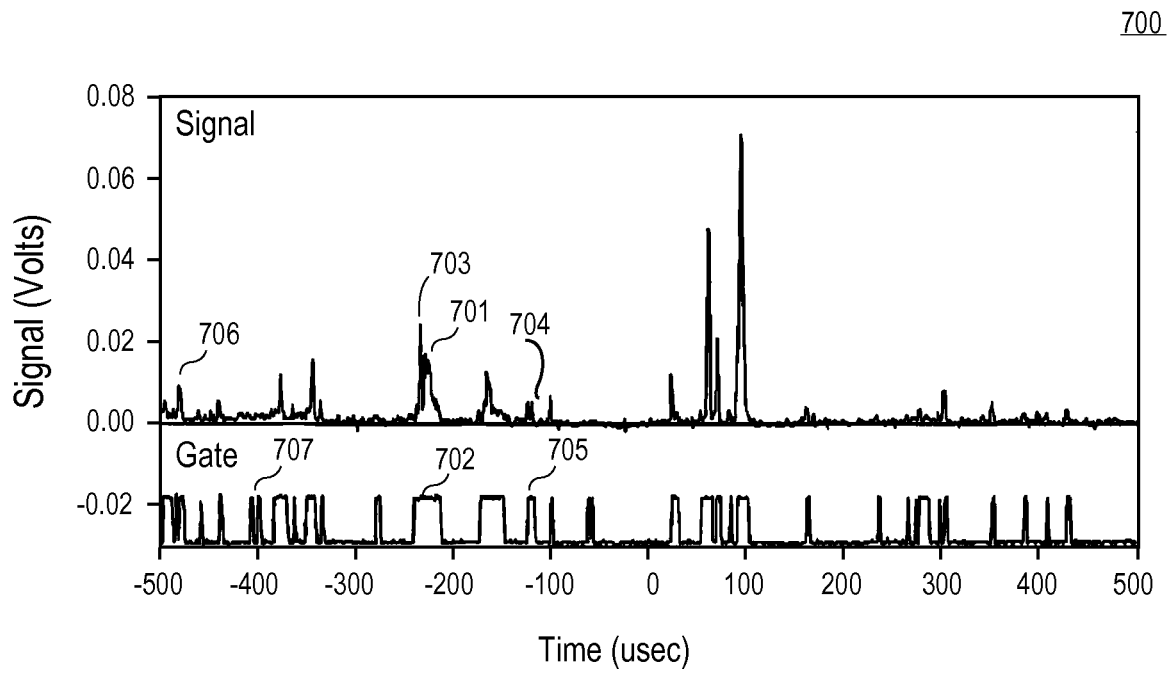
FIG. 7B is a view showing an exemplary embodiment of a time varying signal at a low density particle condition.
Figure 7C:
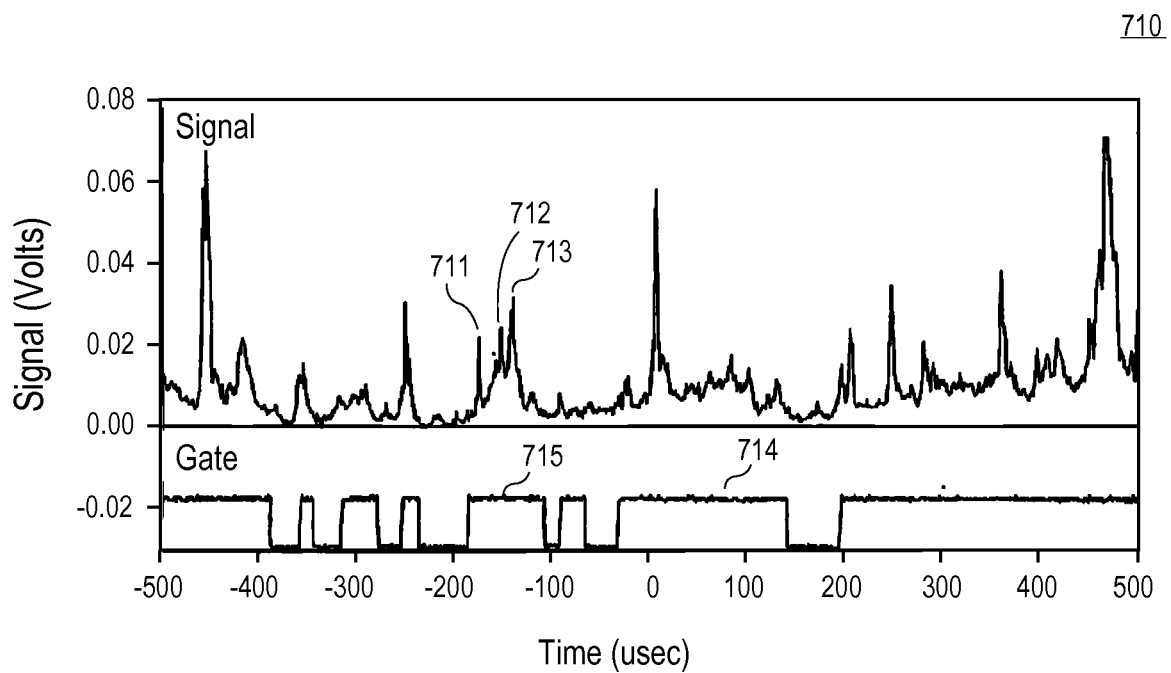
FIG. 7C is a view showing an exemplary embodiment of a time varying signal at a high density particle condition.

FIG. 7B is a view 700 showing an exemplary embodiment of a time varying signal 706 at a low density particle condition. As shown in FIG. 7B, the time varying signal 706 has a plurality of peak amplitudes, such as peak amplitudes 701, 703 and 704. FIG. 7C is a view 710 showing an exemplary embodiment of a time varying signal 711 at a high density particle condition. The density of particles represented by the signal 711 is substantially greater than the density of particles represented by the signal 706. As shown in FIG. 7C, time varying signal 711 has a plurality of peak amplitudes, such as peak amplitudes 712 and 713.

Typically, at the low density particle condition a gate detection signal 707 has components indicating detection of individual particles, such as a component 705 and occasional components indicating detection of coincident events (e.g., two particles in the sample volume at one time being detected as one particle), such as a component 702, as shown in FIG. 7B. Typically, at the high density particle condition the gate detection signal 714 does not have components indicating detection of individual particles, but rather has components indicating detection of coincident events (e.g., multiple particles in the sample volume at one time been detected as one particle), such as a component 715, as shown in FIG. 7C. As shown in FIG. 7C, the time varying signal 711 at dense particle conditions forms a nearly continuous record of individual signals.

Figure 8A:
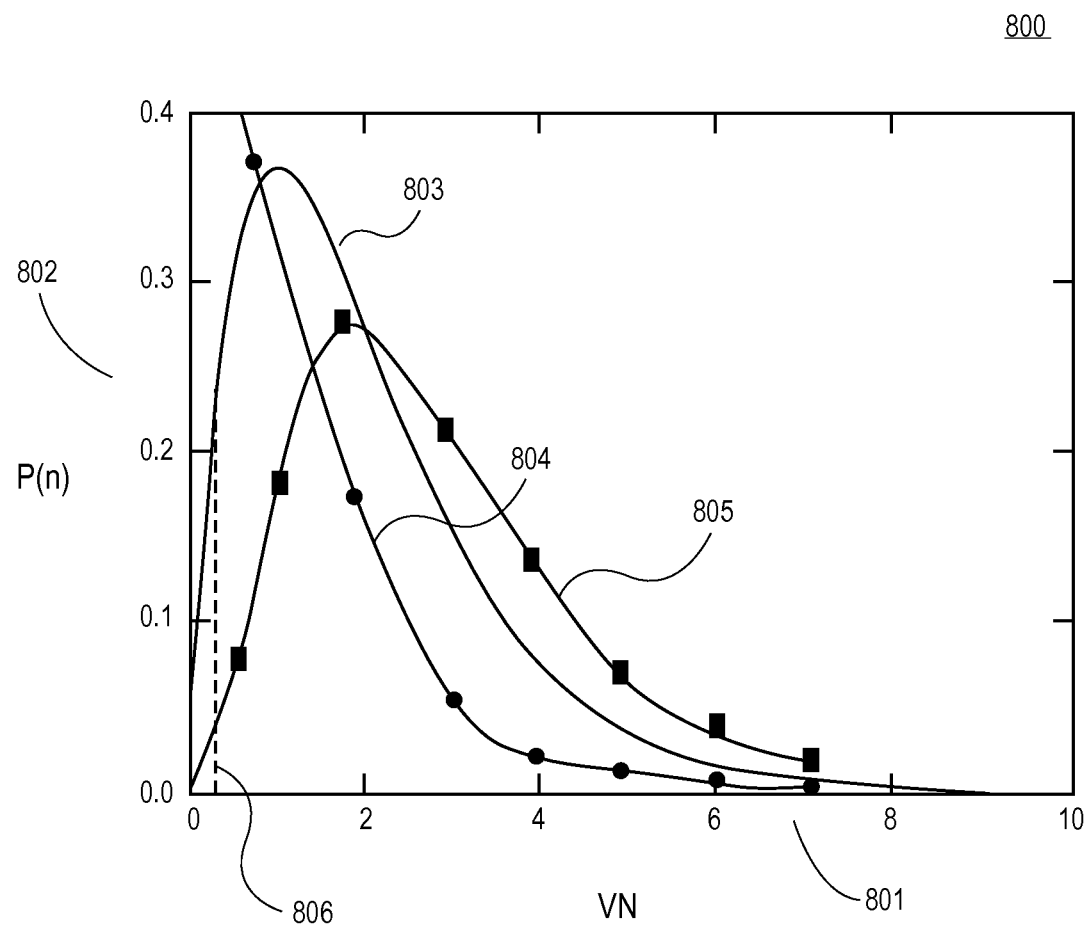
FIG. 8A is a view showing an exemplary embodiment of Poisson statistical analysis to determine a probability of more than one particle residing in a measurement volume.

FIG. 8A is a view 800 showing an exemplary embodiment of Poisson statistical analysis to determine a probability 802 of more than one particle residing in a measurement volume 801 (VN), when measuring the particle number density given as N.

Poisson Statistics are calculated as follows:

$$P(n) = (VN)^n / n! \times e^{-(VN)};$$

$$P(1) = (VN) \times e^{-(VN)}; \text{ and}$$

$$P(n>1) = 1 - P(0) - P(n+1) - P(n+2) \cdots.$$

A probability for having zero particles in the sample volume P(0) is represented by a curve 804. A probability for having one particle in the sample volume P(1) is represented by a curve 803. A probability for having two or more particles in the sample volume P(2) is represented by a curve 805. For an embodiment, to reduce a measurement error, a probability 802 for having one particle in the sample volume P(1) 803 needs to be higher than a probability 802 for having two P(2) or more particles 805 in the sample volume. As shown in FIG. 8A, to reduce the probability of having two P(2) or more particles in the sample volume comparing to P(1), the sample volume V is decreased to a V 806, for example.

Figure 8B:
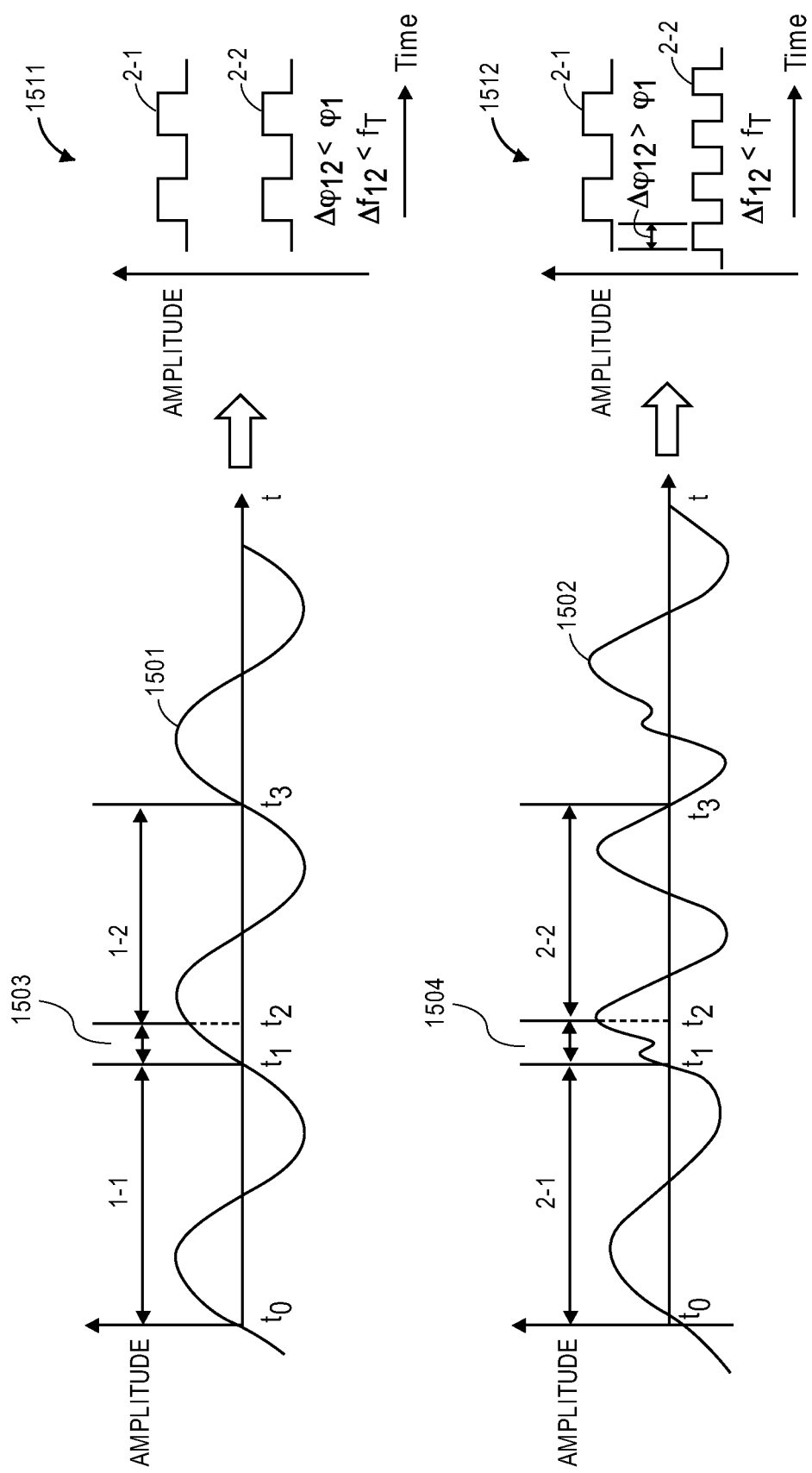
FIG. 8B shows an exemplary embodiment of validating individual particle signal components.

FIG. 8B shows an exemplary embodiment of validating individual particle signal components. Each of the individual particle signal components 1501 and 1502 is partitioned into timing segments. For one embodiment, the timing segments of the individual particle signal have one or more overlapping portions. For another embodiment, the timing segments of the individual particle signal do not have the overlapping portion. As shown in FIG. 8B, an individual particle sub-signal 1501 is partitioned into the timing segments, such as a timing segment 1-1 and a timing segment 1-2. Timing segment 1-1 starts at time t0 and ends at a time t2. Timing segment 1-2 starts at a time t1 and ends at a time t3, as shown in FIG. 8B. Timing segments 1-1 and 1-2 have an overlapping portion 1503. An individual particle sub-signal 1502 is partitioned into the timing segments, such as a timing segment 2-1 and a timing segment 2-2. Timing segment 2-1 starts at time t0 and ends at a time t2. Timing segment 2-2 starts at a time t1 and ends at a time t3, as shown in FIG. 8B. Timing segments 2-1 and 2-2 have an overlapping portion 1504.

A consistency between the frequency of the first timing segment and the frequency of the second timing segment is verified. For one embodiment, consistency of the frequency in each timing segment is defined such that the frequency remains substantially constant. If it is not constant, it may be due to mixed light scattering from reflection and refraction or a change in the signal produced by a second or a third particle. A consistency between the phase shift of the first timing segment and the phase shift of the second timing segment is verified. For one embodiment, consistency of the phase in each time segment is defined such that the phase shift remains substantially constant. The timing segment centered around the peak amplitude of electrical signal is used to separate the individual particle signal components and to identify and measure the frequency and phase of the individual particles. For one embodiment, the consistency of the timing parameter between the timing segments is defined such that the timing parameter (frequency) follows logic over the timing segments. For example, the timing parameter can follow a function F, for example, frequency f=F1($t$) and phase φ=F2($t$) over the timing segments. For an embodiment, verifying the consistency between the timing parameters of the timing segments involves determining a difference between the timing parameter of the first timing segment and the timing parameter of the second timing segment. The difference between the timing parameter of the first timing segment and the timing parameter of the second timing segment is compared to a timing parameter error or difference threshold. The timing parameter error threshold (e.g., $\varphi_T$, $f_T$) may be, for example, less or equal to 20% of the mean value of the timing parameter. The individual particle time varying electrical signal is validated based on the timing parameter (frequency, phase shift, or both) consistency between the timing segments. For an embodiment, the entire time varying electrical signal is accepted for further processing for determining the size and velocity of the individual particle, if the timing parameters of each of the timing segments are consistent between each other. For one embodiment, if the timing parameters of each of the timing segments are substantially constant or follow logic over the timing segments, the entire time varying signal is accepted.

As shown in FIG. 8B, the difference in phase between the timing segments 1-1 and 1-2 $\Delta\varphi_{12}$ is less than the phase threshold $\varphi_T$. The difference in frequency between the timing segments 1-1 and 1-2 $\Delta f_{12}$ is less than the frequency threshold $f_T$. The time varying electrical signal 1501 is accepted for determining the size and velocity of the individual particle.

If the timing segments are not consistent between each other, the segments are separated and further information is used to identify the segments for individual particle signal components. If the timing parameters of each of the timing segments are not substantially constant or do not follow logic over that timing segments, the timing segments are separated. Changes in the timing parameters indicate that a plurality of particle signals are present. For an embodiment, the timing segments are further partitioned until the timing parameters become substantially constant or follow the logic over the timing segments.

As shown in FIG. 8B, the difference in phase between the timing segments 2-1 and 2-2 $\Delta\varphi_{12}$ is greater than the phase threshold $\varphi_T$. The difference in frequency between the timing segments 2-1 and 2-2 $\Delta f_{12}$ is greater than the frequency threshold $f_T$. The segments 2-1 and 2-2 of the time varying signal 1502 are separated and further information is used to identify the segments for individual particle signal components.

The separation is aided by the identification of signal amplitude maxima. For an embodiment, the validation of the individual particle signal components determines whether the time varying signal produced by the photodetectors remains a periodic function,—e.g. a sine wave,—throughout the duration of the signal or the shape of the signal changes in time and space, such that the time varying spatial wave signal becomes a nonperiodic function or the phase, frequency, or both change over the duration of the signal. The nonperiodic signal indicates the presence of multiple light scattering components (e.g., refraction and reflection) or multiple particles in the measurement volume which contribute to the light scattered from the particles that could lead to an erroneous measurement of the size and velocity of the particles.

Figure 9A:
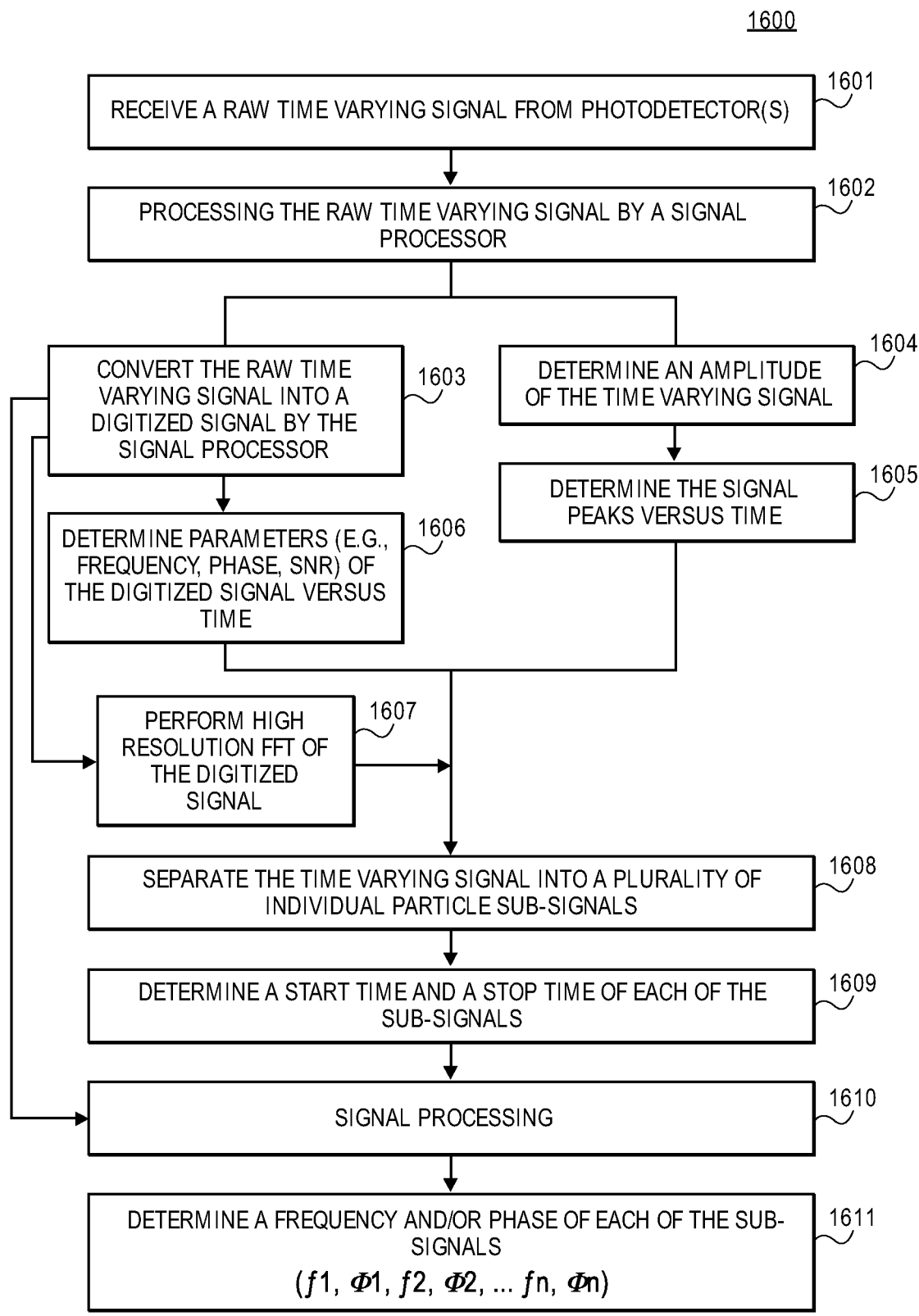
FIG. 9A is a flow chart of one embodiment of a method to mitigate a particle flow and size measurement errors due to coincidence when measuring a particle field.

FIG. 9A is a flow chart of one embodiment of a method 1600 to mitigate a particle flow and size measurement errors due to coincidence in a dense particle field. At operation 1601 a raw time varying signal from one or more photodetectors is received. The raw time varying signal can be any of the time varying signals, e.g., a time varying signal 706 depicted in FIG. 7B and a time varying signal 711, as depicted in FIG. 7C, or any other time varying signal before digitizing. For an embodiment, for a sizing (PDI) channel, at least two raw time varying signals are received. For a velocity (LDV) channel, one raw time varying signal is received for each velocity component. There can be up to three velocity components.

Referring back to FIG. 9A, at operation 1602 the raw time varying signal is processed by a signal processor. The signal processor can be a part of the signal processing system 172, digitizing section 203, or other signal processing system. For an embodiment, the signal processor comprises one or more high speed ADCs.

At operation 1603 the raw time varying signal is converted into a digitized signal by the signal processor. For an embodiment, the raw time varying signal is an analog signal. For an embodiment, the raw time varying signal is converted into a digitized signal by one or more high speed ADCs.

For an embodiment, the raw signals from the photodetectors are filtered and digitized. A burst detector separates actual signals from noise. In a dense particle environment, a burst detector (gate) signal may not fall after each particle signal because they are too close together, as shown in FIGS. 7A and 7B. The burst detector may remain active over several particle arrivals. In standard systems, these signals are treated as a single event. For one embodiment, the raw time varying signals are digitized (A/D) and transferred to the computer. For an embodiment, a separate packet containing the intensity of the digitized signal versus time is also transferred to the computer. For an embodiment, converting the raw time varying signal into a digitized signal comprises partitioning a time varying signal into a plurality of timing segments, as described above.

At operation 1606 parameters (e.g., a frequency, phase, signal-to-noise ratio (SNR)) of the digitized signal versus time are determined. Using the digitized signal from the processor, the frequency, phase, and SNR versus time are calculated by a processor. The parameters of the digitized signal versus time are determined from the timing segments, as described above. For an embodiment, a change in at least one of the parameters for the timing segments is determined, as described above.

At operation 1604, amplitude of the time varying signal is determined. At operation 1605 the signal peaks are determined versus time from the amplitude information. For an embodiment, determining the signal peaks involves locating one or more peak amplitudes, e.g., peak amplitudes 712 and 713 in the time varying signal, as described above. For an embodiment, the location (in time) of the signal peaks (and optionally, valleys) are calculated using the digitized intensity (amplitude) of the signal vs. time record stored in a memory. For an embodiment, the peak amplitude corresponds to the center of a sub-signal, and the valley correspond to the end of one sub-signal and to the start of the following sub-signal, depending on how far apart these sub-signals are in time.

The timing segments are adjusted based on the peak amplitudes to capture durations of individual particle signal components. For an embodiment, operations 1603 and 1604 are performed in any order relative to each other. For an embodiment, operations 1603 and 1604 are performed in parallel. For an embodiment, operations 1606 and 1605 are performed in parallel. For an embodiment, operations 1603, 1604, 1606, 1605 are repeated iteratively for the adjusted timing segments until a plurality of individual particle signal components are identified in the time varying signal. At operation 1607, a high resolution FFT of the digitized signal is performed. For an embodiment, the frequency spectrum of the digitized signal is calculated using a high resolution FFT or other techniques known to one of ordinary skill in the art of signal processing. For an embodiment, each frequency spike in the frequency spectrum indicates at least one sub-signal.

Method 1600 continues with operation 1608 that involves separating the time varying signal into a plurality of individual particle signal components based on the information obtained from operations 1603, 1604, 1605, 1606 and 1607. For an embodiment, using the frequency, phase, and SNR vs time, (and optionally, the signal peaks/valleys and number of frequency spikes), the digital signal comprising a plurality of samples is separated into sub-signals. For an embodiment, it is determined if the SNR is greater than a SNR background threshold, and a sub-signal is identified if the SNR is greater than the SNR background threshold. For an embodiment, the frequency versus time is substantially constant in the presence of a sub-signal.

For an embodiment, the phase difference vs. time is substantially constant in the presence of a sub-signal. For an embodiment, the plurality of individual particle signal components are identified based at least on the change in at least one of the parameters, as described above.

At operation 1609 a start time and a stop time of each of the individual particle signal components are determined, as described above. At operation 1610 each of the individual particle signal components is processed. For an embodiment, the digitized signal is split based on the start and stop times of each of the individual particle components. These individual particle components are then processed as separate signals for frequency, phase, SNR, signal amplitude, and other parameters.

For an embodiment, the processing of each of the individual particle signal components involves determining at least one of the plurality of parameters for each of the individual particle signal components, and validating each of the individual particle signal components based on the at least one of the plurality of parameters, as described above. At operation 1611 a frequency, a phase, or both frequency and phase of each of the individual particle signal components (e.g., f1, φ1, f2, φ2, . . . fn, φn) are determined to estimate a velocity and a size of a particle from each of the validated individual particle signal components, as described above.

Figure 9B:
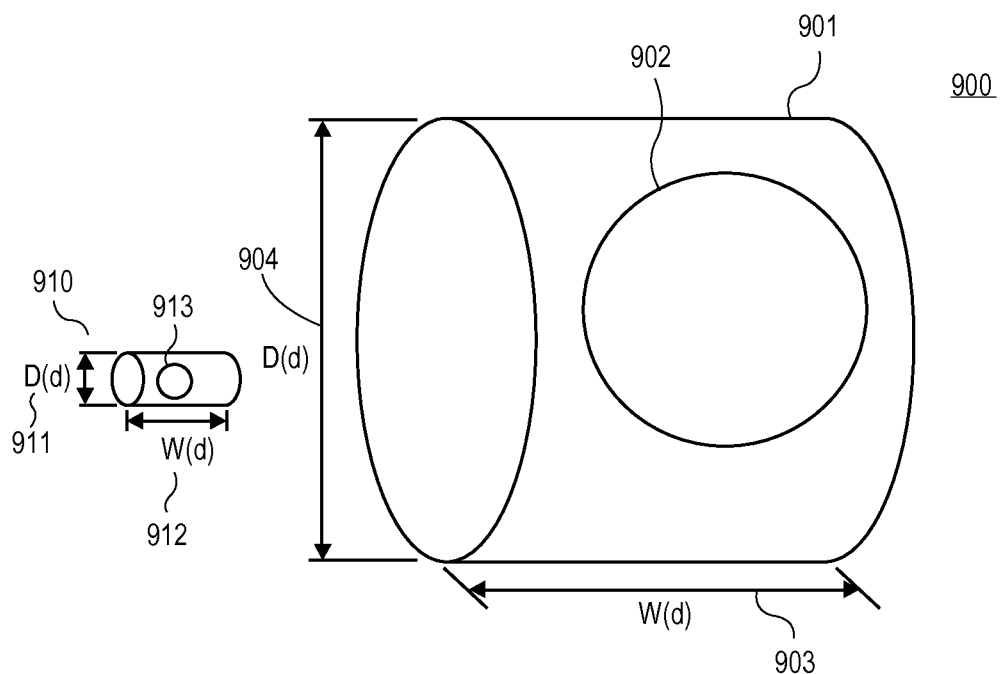
FIG. 9B is a view illustrating an exemplary embodiment of reduction of a sample volume to reduce the probability of having two or more particles.

FIG. 9B is a view 900 illustrating an exemplary embodiment of reduction of a sample volume to reduce the probability of having two or more particles. A sample volume 901 has a width W (d) 903 and a diameter D (d) 904. Sample volume 901 can contain a particle 902. Sample volume 901 is reduced to a sample volume 910. Sample volume 910 has a width W (d) 912 and a diameter D (d) 911 smaller than the sample volume 901. Sample volume 910 only can contain particles, such as a particle 913 that are smaller than particle 901. That is, although the particle coincidence (more than one particle residing in the measurement volume at one time) can be mitigated by reducing the size of the measurement volume, there is a limit to the size of the reduced measurement volume that can be used. As shown in FIG. 9B, the sample volume 901 cannot be reduced to the sample volume 910, as particle 902 is too big and cannot reside in the reduced volume 910. Embodiments described herein advantageously mitigate particle measurement errors when there is a limit to the size of the reduced measurement volume.

Figure 10:
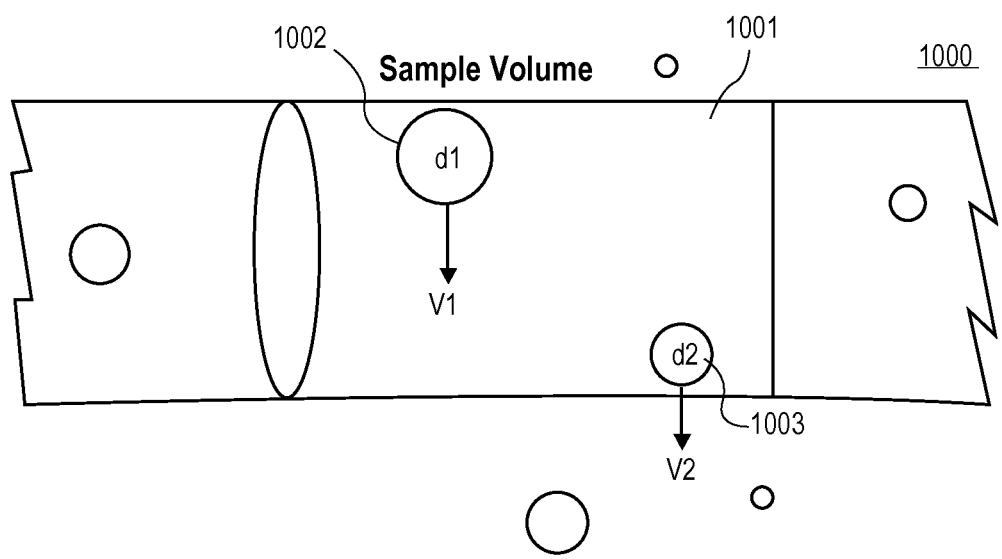
FIG. 10 is a view illustrating an exemplary embodiment of a condition of more than one particle residing in a sample volume at one time.

FIG. 10 is a view 1000 illustrating an exemplary embodiment of a condition of more than one particle residing in a sample volume at one time. A sample volume 1001 contains a particle 1002 passing through the sample volume with a velocity V1 and a particle 1003 passing through the sample volume with a velocity V2. Measuring the particles in a sample volume having a plurality of particles at one time using a gate detector can lead to measurement uncertainty and error. Embodiments described herein advantageously mitigate particle measurement errors when the sample volume has a plurality of particles at one time.

Figure 11:
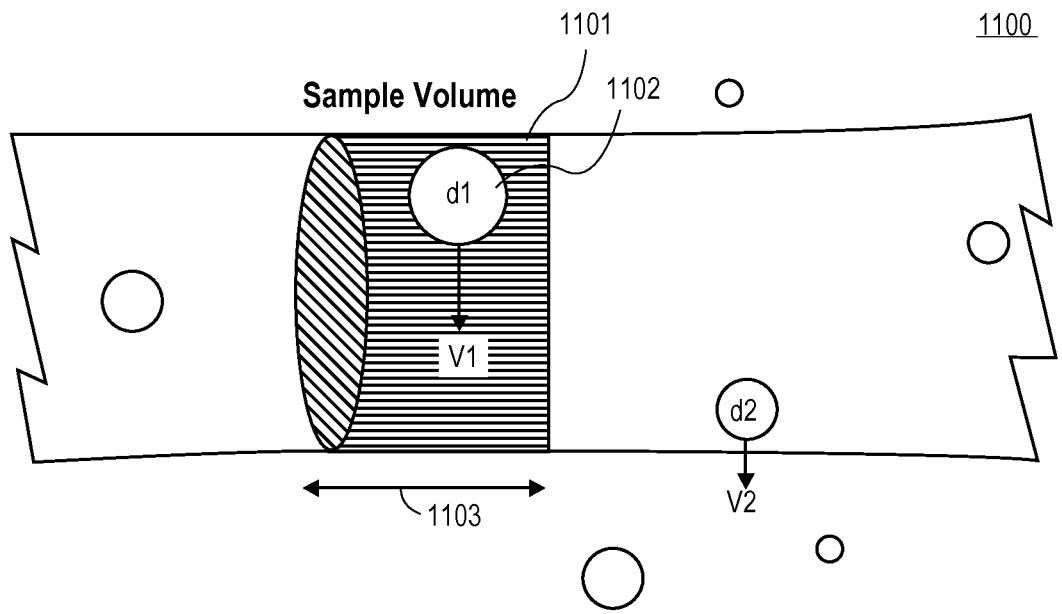
FIG. 11 is a view illustrating an exemplary embodiment of reducing a sample volume by decreasing the width of a slit aperture in the receiving optics.

FIG. 11 is a view illustrating an exemplary embodiment of reducing a sample volume by decreasing the width of a slit aperture in the receiving optics. As shown in FIG. 11, the sample volume 1001 shown in FIG. 10 is decreased to a sample volume 1101 to incorporate only one particle 1102 passing through the sample volume with a velocity V1. As shown in FIG. 11, the size of the measurement volume is decreased by reducing an observation length 1103 along a laser beam.

Figure 12:
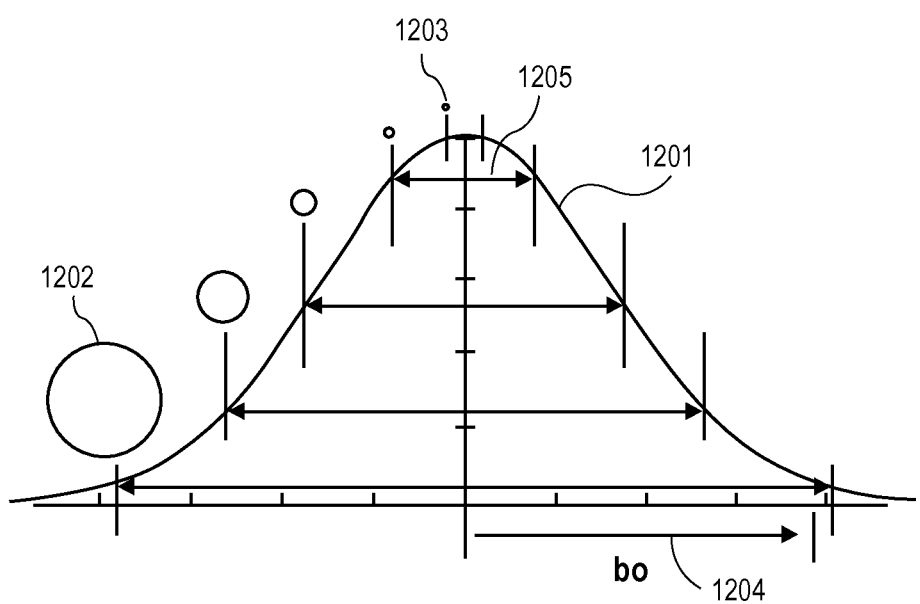
FIG. 12 is a view showing a schematic illustrating an exemplary embodiment of the effect of a Gaussian laser beam on the detectability of different size particles.

FIG. 12 is a view 1200 showing a schematic illustrating an exemplary embodiment of the effect of a Gaussian laser beam 1201 on the detectability of different size particles. The Gaussian laser beam 1201 has a waist size $b_o$ 1204. As shown in FIG. 12, the size of the particles decreases from a particle 1202 to a particle 1203. The larger particle has larger measurement volume, as shown in FIG. 12. For an embodiment, the Gaussian laser beam 1201 causes a change in the effective sampling cross-section as a function of a particle size, as shown in FIG. 12. For an embodiment, the intensity of the Gaussian beam 1201 has a favorable effect in terms of measuring in high density particle environments because the measurement volume is smallest for the smallest particles, such as particle 1203 which are most plentiful in typical spray droplet and other particle size distributions. For an embodiment, the Gaussian laser beam 1201 needs to be accurately characterized to normalize the sampling statistics. For an embodiment, the Gaussian laser beam 1201 partially achieves an effect of reducing sample volume size with decreasing the particle size. For an embodiment, the Gaussian laser beam 1201 complicates definition of sampling cross-sectional area. Embodiments described herein advantageously mitigate particle measurement errors when the sample volume that contains a plurality of particles at one time is created using the Gaussian laser beam.

Figure 13:
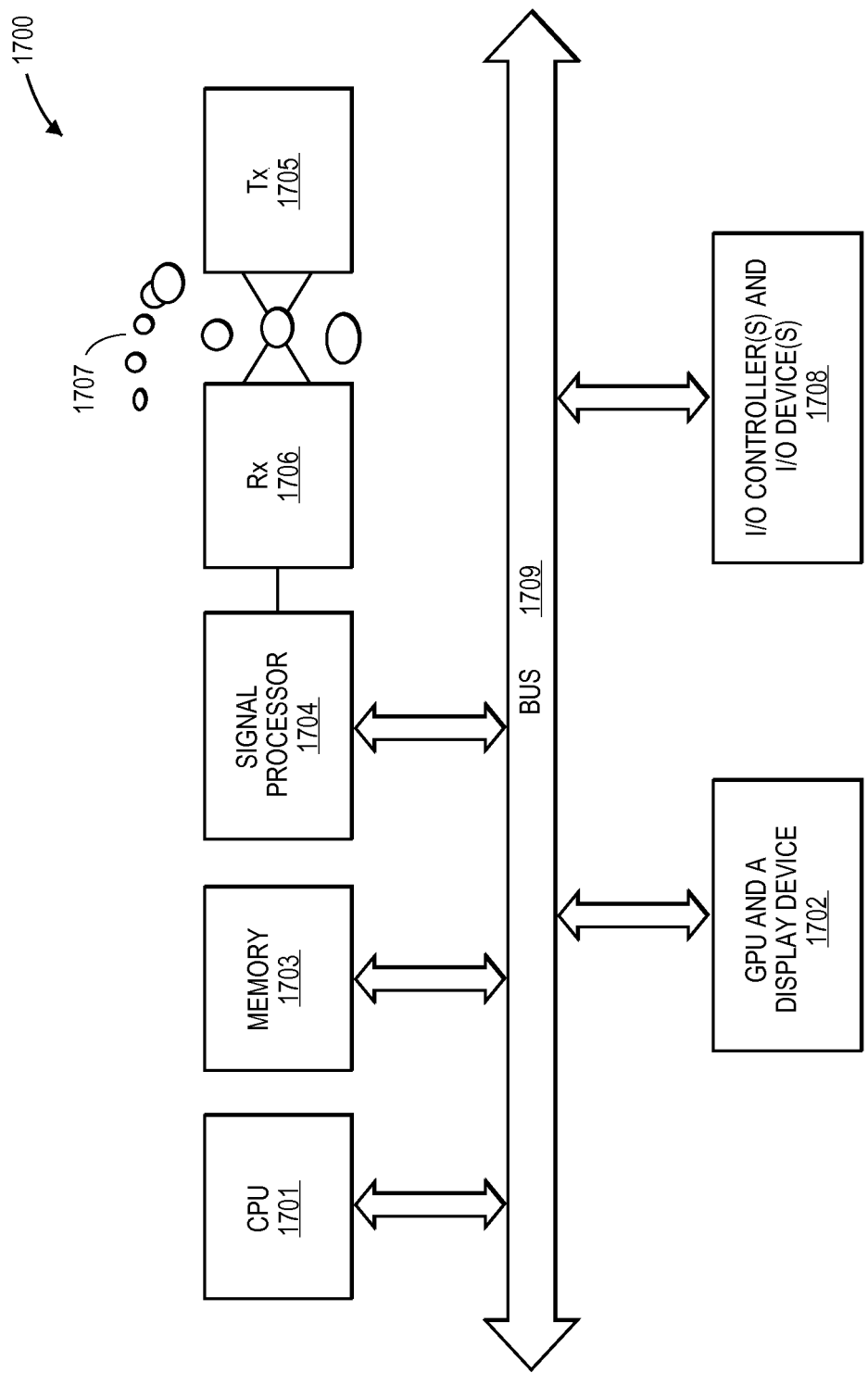
FIG. 13 illustrates one embodiment of a system to mitigate particle measurement errors in a dense particle field.

FIG. 13 illustrates one embodiment of a system to mitigate particle measurement errors in a dense particle field. As shown on FIG. 13, system 1700 includes a transmitter 1705 to generate coherent laser beams crossed at an angle to form a sample volume to illuminate particles 1707, as described above. As shown in FIG. 13, a receiver 1706 is coupled to receive the light scattered from the particles 1707, as described above. As shown in FIG. 13, receiver 1706 is coupled to signal processor 1706. As shown in FIG. 13, system 1700 includes a subsystem 1701, e.g., a central processing unit (CPU), a subsystem 1702, e.g., a graphics processing unit (GPU), that may be coupled with a display device, one or more subsystems 1708, e.g., one or more I/O controllers coupled to one or more I/O devices, a memory 1703 (e.g., a volatile RAM, a ROM, and a non-volatile memory, e.g., a hard drive) and a signal processor 1704, e.g., a microcontroller, coupled to a bus 1709. Signal processor 1704 is configured to perform methods as described above with respect to FIGS. 1-16. Memory 1704 may be used to store measured and processing data, peak amplitude data, amplitude and SNR data, time parameter error thresholds, and other data as records, as described above.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method to enhance detection of particles, comprising:
   a) receiving a time varying signal generated from a light scattered from one or more particles that forms an interference fringe pattern, wherein the time varying signal is a contiguous signal;
   b) partitioning the time varying signal into a plurality of timing segments comprising a first timing segment and a second timing segment;
   c) determining a plurality of parameters from the plurality of timing segments, wherein the plurality of parameters comprise at least one of a frequency and a phase;
   d) determining a change in the at least one of the frequency and the phase between the first timing segment and the second timing segment;
   e) identifying the first timing segment and the second timing segment as being associated with a single particle, when the change is not greater than a threshold;
   f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events; and
   g) adjusting the plurality of timing segments, wherein the partitioning and determining operations are repeated iteratively for the adjusted segments until at least the first individual particle signal component and the second individual particle signal component are identified, wherein operations a), b), c), d), e), f), and g) are performed by a processor.

2. The method of claim 1, wherein the plurality of parameters further comprise:
   an amplitude, a signal duration, a transit time, a signal-to-noise ratio, or any combination thereof.

3. The method of claim 1, further comprising:
   locating peak amplitudes in the time varying signal; and
   adjusting the plurality of timing segments based on the located peak amplitudes to capture durations of at least the first individual particle signal component and the second individual particle signal component.

4. The method of claim 1, further comprising:
   determining at least one of the plurality of parameters for each of the first individual particle signal component and the second individual particle signal component;
   validating each of the first individual particle signal component and the second individual particle signal component based on the at least one of the plurality of parameters; and
   determining at least one of a velocity and a size of a particle from each of the validated individual particle signal components.

5. The method of claim 1, wherein the time varying signal is a sampled signal.

6. A method to mitigate particle measurement errors in a dense particle field, comprising:

a) receiving a time varying signal generated from a light scattered from one or more particles that forms an interference fringe pattern, wherein the time varying signal is a contiguous signal;
b) partitioning the time varying signal into a plurality of timing segments comprising a first timing segment and a second timing segment;
c) locating peak amplitudes in the plurality of timing segments;
d) determining a change in at least one of parameters comprising a frequency and a phase between the first timing segment and the second timing segment;
e) identifying the first timing segment and the second timing segment as being associated with a single particle, when the change is not greater than a threshold;
f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident event; and
g) determining an estimated particle transit time, wherein at least the first individual particle signal component and the second individual particle signal component are identified based on the estimated transit time wherein operations a, b, c, d, e, f, and g are performed by a processor.

7. The method of claim 6, wherein the at least one of parameters further comprise a signal duration, a particle transit time, a signal-to-noise ratio, or any combination thereof.

8. The method of claim 6, further comprising:
validating each of the first individual particle signal component and the second individual particle signal component based on the at least one of the frequency and the phase; and
determining at least one of a velocity and a size of a particle from each of the validated first individual particle signal component and the second individual particle signal component.

9. The method of claim 6, wherein the time varying signal comprises a number of samples based on at least one of a signal duration and a sampling frequency.

10. A method to mitigate particle measurement errors in a dense particle field, comprising:
a) receiving a time varying signal generated from a light scattered from one or more particles that forms an interference fringe pattern, wherein the time varying signal is a continuous signal;
b) partitioning the time varying signal into a plurality of timing segments comprising a first timing segment and a second timing segment;
c) locating peak amplitudes in the plurality of timing segments;
d) determining a change in at least one of parameters comprising a frequency and a phase between the first timing segment and the second timing segment;
e) identifying the first timing segment and the second timing segment as being associated with a single particle, when the change is not greater than a threshold;
f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events; and
g) determining a duration of the time varying signal, wherein at least the first individual particle signal component and the second individual particle signal component are identified based on the duration wherein operations a, b, c, d, e, f, and g are performed by a processor.

11. A method to mitigate particle measurement errors in a dense particle field, comprising:
a) receiving a time varying signal generated from a light scattered from one or more particles that forms an interference fringe pattern, wherein the time varying signal is a contiguous signal;
b) partitioning the time varying signal into a plurality of timing segments comprising a first timing segment and a second timing segment;
c) locating peak amplitudes in the plurality of timing segments;
d) determining a change in at least one of parameters comprising a frequency and a phase between the first timing segment and the second timing segment;
e) identifying the first timing segment and the second timing segment as being associated with a single particle, when the change is not greater than a threshold;
f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events; and
g) adjusting a duration of the plurality of timing segments based on the peak amplitudes, wherein operations b, c and d are repeated iteratively for the adjusted timing segments until at least the first individual particle signal component and the second individual particle signal component are identified, wherein operations a, b, c, d, e, f, and g are performed by a processor.

12. A non-transitory machine-readable medium storing data to cause a data processing system to perform a method to enhance detection of particles comprising:
a) receiving a time varying signal generated from a light scattered from one or more particles that forms an interference fringe pattern, wherein the time varying signal is a contiguous signal;
b) partitioning the time varying signal into a plurality of timing segments comprising a first timing segment and a second timing segment;
c) determining a plurality of parameters from the plurality of timing segments, wherein the plurality of parameters comprise at least one of a frequency, and a phase;

d) determining a change in the at least one of the frequency and the phase between the first timing segment and the second timing segment;

e) identifying the first timing segment and the second timing segment as being associated with a single particle, when the change is not greater than a threshold; and f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events.

13. The non-transitory machine-readable medium of claim 12, further comprising data that cause the data processing system to perform operations comprising:
adjusting the plurality of timing segments, wherein the partitioning and determining operations are repeated iteratively for the adjusted segments until at least the first individual particle signal component and the second individual particle signal component are identified.

14. The non-transitory machine-readable medium of claim 12, wherein the plurality of parameters further comprise an amplitude, a signal duration, a transit time, a signal-to-noise ratio, or any combination thereof.

15. The non-transitory machine-readable medium of claim 12, further comprising data that cause the data processing system to perform operations comprising:
locating peak amplitudes in the time varying signal; and
adjusting the plurality of timing segments based on the located peak amplitudes to capture durations of at least the first individual particle signal component and the second individual particle signal component.

16. The non-transitory machine-readable medium of claim 12, further comprising data that cause the data processing system to perform operations comprising:
determining at least one of the plurality of parameters for each of the first individual particle signal component and the second individual particle signal component;
validating each of the first individual particle signal component and the second individual particle signal component based on the at least one of the plurality of parameters; and
determining at least one of a velocity and a size of a particle from each of the validated first individual particle signal component and the second individual particle signal component.

17. The non-transitory machine-readable medium of claim 12, wherein the time varying signal is a digitized signal, wherein a number of samples of the digitized signal is determined based on at least one of a signal duration and a sampling frequency.

18. A non-transitory machine-readable medium storing data to cause a data processing system to perform a method to mitigate particle measurement errors in a dense particle field, comprising:
a) receiving a time varying signal generated from a light scattered from one or more particles that forms an interference fringe pattern, wherein the time varying signal is a contiguous signal;
b) partitioning the time varying signal into a plurality of timing segments comprising a first timing segment and a second timing segment;

c) locating peak amplitudes in the plurality of timing segments;

d) determining a change in at least one of parameters comprising a frequency and a phase between the first timing segment and the second timing segment;

e) identifying the first timing segment and the second timing segment as being associated with a single particle, when the change is not greater than a threshold; and f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events, wherein operations a, b, c, d, e, and f are performed by a processor.

19. The non-transitory machine-readable medium of claim 18, wherein the at least one of parameters further comprise a signal duration, a particle transit time, a signal-to-noise ratio, or any combination thereof.

20. The non-transitory machine-readable medium of claim 18, further comprising data that cause the data processing system to perform operations comprising:
determining an estimated particle transit time, wherein at least the first individual particle signal component and the second individual particle signal component are identified based on the estimated transit time.

21. The non-transitory machine-readable medium of claim 18, further comprising data that cause the data processing system to perform operations comprising:
determining a duration of the time varying signal, wherein at least the first individual particle signal component and the second individual particle signal component are identified based on the duration.

22. The non-transitory machine-readable medium of claim 18, further comprising data that cause the data processing system to perform operations comprising:
validating each of the first individual particle signal component and the second individual particle signal component based on the at least one of the frequency and the phase; and
determining at least one of a velocity and a size of a particle from each of the validated first individual particle signal component and the second individual particle signal component.

23. The non-transitory machine-readable medium of claim 18, wherein the time varying signal comprises a number of samples based on at least one of a signal duration and a sampling frequency.

24. The non-transitory machine-readable medium of claim 18, further comprising data that cause the data processing system to perform operations comprising:
adjusting a duration of the plurality of timing segments based on the peak amplitudes, wherein operations b, c and d are repeated iteratively for the adjusted timing segments until at least the first individual particle signal component and the second individual particle signal component are identified.

25. An apparatus to enhance detection of particles, comprising:
a memory, and
a processor coupled to the memory, wherein the processor is to a) receive a time varying signal generated from a light scattered from one or more particles that forms an interference fringe pattern, wherein the time varying signal is a contiguous signal; the processor is to b) partition the time varying signal into a plurality of timing segments comprising a first timing segment and a second timing segment, the processor is to c) determine a plurality of parameters from the plurality of timing segments, wherein the plurality of parameters comprise at least one of a frequency and a phase; the processor is to d) determine a change in at least one of the frequency and the phase between the first timing segment and the second timing segment; the processor is to e) identify the first timing segment and the second timing segment as being associated with a single particle, when the change is not greater than a threshold; and the processor is to f) identifying the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events.

26. The apparatus of claim 25, wherein the processor is further to adjust the plurality of timing segments, wherein the partitioning and determining operations are repeated iteratively for the adjusted segments until at least the first individual particle signal component and the second individual particle signal component are identified.

27. The apparatus of claim 25, wherein the plurality of parameters further comprises an amplitude, a signal duration, a transit time, a signal-to-noise ratio, or any combination thereof.

28. The apparatus of claim 25, wherein the processor is further to locate peak amplitudes in the time varying signal; and to adjust the plurality of timing segments based on the located peak amplitudes to capture durations of the first individual particle signal component and the second individual particle signal component.

29. The apparatus of claim 25, wherein the processor is further to determine at least one of the plurality of parameters for each of the first individual particle signal component and the second individual particle signal component; the processor is further to validate each of the first individual particle signal component and the second individual particle signal component based on the at least one of the plurality of parameters; and the processor is further to determine at least one of a velocity and a size of a particle from each of the validated first individual particle signal component and the second individual particle signal component.

30. The apparatus of claim 25, wherein the time varying signal is a sampled signal.

31. An apparatus to mitigate particle measurement errors in a dense particle field, comprising:
a memory; and
a processor coupled to the memory, wherein the processor is to
a) receive a time varying signal generated from a light scattered from one or more particles that forms an interference fringe pattern, wherein the time varying signal is a contiguous signal, the processor is to
b) partition the time varying signal into a plurality of timing segments comprising a first timing segment and a second timing segment; wherein the processor is to
c) locate peak amplitudes in the plurality of timing segments; wherein the processor is to
d) determine a change in at least one of parameters comprising a frequency and a phase between the first timing segment and the second timing segment; wherein the processor is to
e) identify the first timing segment and the second timing segment as being associated with a single particle, when the change is not greater than a threshold; and wherein the processor is to
f) identify the first timing segment as a first individual particle signal component produced by a first particle and identifying the second timing segment as a second individual particle signal component produced by a second particle, when the change in the at least one of the frequency and the phase is greater than the threshold when a sample volume has a plurality of particles including the first particle and the second particle within a time duration to mitigate at least one of a particle size measurement error and a particle velocity measurement error and a false counting of particles under coincident events.

32. The apparatus of claim 31, wherein the at least one of parameters further comprise a signal duration, a particle transit time, a signal-to-noise ratio, or any combination thereof.

33. The apparatus of claim 31, wherein the processor is further to determine an estimated particle transit time, wherein at least the first individual particle signal component and the second individual particle signal component are identified based on the estimated transit time.

34. The apparatus of claim 31, wherein the processor is further to determine a duration of the time varying signal, wherein at least the first individual particle signal component and the second individual particle signal component are identified based on the duration.

35. The apparatus of claim 31, wherein the processor is further to validate each of the first individual particle signal component and the second individual particle signal component based on the at least one of the frequency and the phase; and wherein the processor is further to determine at least one of a velocity and a size of a particle from each of the validated first individual particle signal component and the second individual particle signal component.

36. The apparatus of claim 31, wherein the time varying signal is a sampled signal.

37. The apparatus of claim 31, wherein the processor is further to adjust a duration of the plurality of timing segments based on the peak amplitudes, wherein operations b, c and d are repeated iteratively for the adjusted timing segments until at least the first individual particle signal component and the second individual particle signal component are identified.

* * * * *